United States Patent
Lecroart et al.

(10) Patent No.: US 10,039,138 B2
(45) Date of Patent: Jul. 31, 2018

(54) RELAYING USER COMMUNICATION DEVICE ENABLING RRC, NAS CONNECTIONS, USER COMMUNICATION DEVICE, BASE STATION, SYSTEM, METHOD, AND NON-TRANSITORY COMPUTER READABLE MEDIUM STORING A PROGRAM

(71) Applicant: NEC Corporation, Tokyo (JP)

(72) Inventors: Benoit Lecroart, Berkshire (GB); Christophe Le Thierry D'Ennequin, Berkshire (GB); Dorin Panaitopol, Berkshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/774,080

(22) PCT Filed: Feb. 19, 2015

(86) PCT No.: PCT/JP2015/000784
§ 371 (c)(1),
(2) Date: Sep. 9, 2015

(87) PCT Pub. No.: WO2015/125479
PCT Pub. Date: Aug. 27, 2015

(65) Prior Publication Data
US 2016/0360563 A1    Dec. 8, 2016

(30) Foreign Application Priority Data

Feb. 19, 2014  (GB) .................................. 1402954.0

(51) Int. Cl.
*H04B 7/14*  (2006.01)
*H04W 76/02*  (2009.01)
(Continued)

(52) U.S. Cl.
CPC ......... *H04W 76/022* (2013.01); *H04L 69/322* (2013.01); *H04W 40/22* (2013.01);
(Continued)

(58) Field of Classification Search
CPC . H04W 76/021; H04W 76/022; H04W 40/00; H04W 40/22; H04W 88/04; H04L 69/322; H04L 69/324
See application file for complete search history.

(56) References Cited

U.S. PATENT DOCUMENTS 8,964,781 B2 * 2/2015 Hunzinger ............. H04B 7/155
370/236
9,307,575 B2 * 4/2016 Lee ....................... H04W 88/04
(Continued)

FOREIGN PATENT DOCUMENTS

WO   WO 2010/006649 A1   1/2010

OTHER PUBLICATIONS

3GPP TR 23.703, V1.0.0, "Study on architecture enhancements to support Proximity-based Services (ProSe)", 3rd Generation Partnership Project; Technical Specification Group Services and System Aspects, Release 12, pp. 1-270, Dec. 2013.
(Continued)

*Primary Examiner* — Kevin Mew
(74) *Attorney, Agent, or Firm* — Finnegan, Henderson, Farabow, Garrett & Dunner, L.L.P.

(57) ABSTRACT

A system is disclosed in which a UE-Relay receives, from a user communication device, a message requesting the provision of a communication link (e.g. a Layer 2 link) between the user communication device and a network serving the user communication device. The UE-Relay communicates with its core network, responsive to the received message, to establish the communication link from the user communication device to a base station remote from the UE-Relay;
(Continued)

and relays data, between the user communication device and the base station using the communication link.

15 Claims, 16 Drawing Sheets

(51) Int. Cl.
| | |
|---|---|
| *H04L 29/08* | (2006.01) |
| *H04W 40/22* | (2009.01) |
| *H04W 76/12* | (2018.01) |
| *H04W 76/11* | (2018.01) |
| *H04W 88/04* | (2009.01) |
| *H04W 76/14* | (2018.01) |

(52) U.S. Cl.
CPC ............ *H04W 76/11* (2018.02); *H04W 76/12* (2018.02); *H04W 76/14* (2018.02); *H04W 88/04* (2013.01)

(56) References Cited

U.S. PATENT DOCUMENTS

| | | | | |
|---|---|---|---|---|
| 9,374,767 | B2* | 6/2016 | Bienas | H04W 48/08 |
| 9,635,567 | B2* | 4/2017 | Bienas | H04W 24/02 |
| 2002/0187746 | A1* | 12/2002 | Cheng | H04W 74/08 455/11.1 |
| 2007/0249347 | A1* | 10/2007 | Saifullah | H04W 36/38 455/436 |
| 2008/0009243 | A1* | 1/2008 | Hart | H04W 52/46 455/67.13 |
| 2008/0031182 | A1* | 2/2008 | Maheshwari | H04B 7/155 370/320 |
| 2010/0128622 | A1* | 5/2010 | Horiuchi | H04B 7/155 370/252 |
| 2010/0167743 | A1* | 7/2010 | Palanki | H04B 7/155 455/436 |
| 2012/0149362 | A1* | 6/2012 | Tooher | H04W 24/10 455/423 |
| 2012/0208523 | A1* | 8/2012 | Hans | H04W 64/00 455/422.1 |
| 2012/0213145 | A1* | 8/2012 | Aminaka | H04B 7/2606 370/312 |
| 2012/0231797 | A1* | 9/2012 | Van Phan | H04B 7/15592 455/437 |
| 2012/0281614 | A1* | 11/2012 | Deng | H04W 88/04 370/315 |
| 2013/0016649 | A1 | 1/2013 | Damnjanovic et al. | |
| 2013/0023204 | A1* | 1/2013 | Ode | H04B 7/15507 455/11.1 |
| 2013/0194948 | A1* | 8/2013 | Mallik | H04W 24/00 370/252 |
| 2013/0329711 | A1* | 12/2013 | Seo | H04J 11/0069 370/336 |
| 2014/0003327 | A1* | 1/2014 | Seo | H04W 36/08 370/315 |
| 2014/0133332 | A1* | 5/2014 | Lee | H04W 88/04 370/252 |
| 2014/0155114 | A1* | 6/2014 | Wu | H04W 76/043 455/509 |
| 2015/0085740 | A1* | 3/2015 | Kalapatapu | H04W 88/04 370/315 |
| 2015/0215903 | A1* | 7/2015 | Zhao | H04W 72/04 370/329 |
| 2015/0249979 | A1* | 9/2015 | Kim | H04W 72/0413 370/329 |
| 2015/0305070 | A1* | 10/2015 | Ahmad | H04W 48/20 370/338 |
| 2016/0088668 | A1* | 3/2016 | Kim | H04W 76/023 370/315 |
| 2016/0285539 | A1* | 9/2016 | Sadiq | H04W 8/005 |
| 2017/0026896 | A1* | 1/2017 | Enomoto | H04W 76/043 |
| 2017/0048922 | A1* | 2/2017 | Lee | H04W 76/068 |
| 2017/0055307 | A1* | 2/2017 | Cao | H04W 72/04 |
| 2017/0086114 | A1* | 3/2017 | Jung | H04W 36/08 |
| 2017/0317740 | A1* | 11/2017 | Basu Mallick | H04B 7/15557 |

OTHER PUBLICATIONS

3GPP TS 23.303, V0.1.0, "Proximity based Services; Stage 2", 3$^{rd}$ Generation Partnership Project; Technical Specification Group Services and System Aspects, Release 12, pp. 1-8, Jan. 2014.
NEC, "L2 ProSe UE-to-Network Relay alternative", SA WG2 Meeting #S2-99, S2-133366, pp. 1-8, May 2013.
Search Report in corresponding GB Application No. GB1402954.0 dated Jun. 4, 2014.
International Search Report and Written Opinion dated Jul. 2, 2015.

* cited by examiner

RELAYING USER COMMUNICATION DEVICE ENABLING RRC, NAS CONNECTIONS, USER COMMUNICATION DEVICE, BASE STATION, SYSTEM, METHOD, AND NON-TRANSITORY COMPUTER READABLE MEDIUM STORING A PROGRAM

CROSS-REFERENCE TO RELATED PATENT APPLICATIONS

This application is a National Stage Entry of International Application No. PCT/JP2015/000784, filed Feb. 19, 2015, which claims priority from British Patent Application No. 1402954.0, filed Feb. 19, 2014. The entire contents of the above-referenced applications are expressly incorporated herein by reference.

TECHNICAL FIELD

The present invention relates to a communication system and to parts and methods thereof. The invention has particular but not exclusive relevance to wireless communication systems and devices thereof operating according to the 3GPP standards or equivalents or derivatives thereof.

BACKGROUND ART

Wireless communication systems enable users of User Equipment (UE) to communicate with other such users via one of a number of base stations and via one or a number of core networks. Typically, the UEs are mobile terminals, such as mobile (cellular) telephones and the like, although the term UE may also refer to generally stationary communication devices, such as laptop computers, web browsers, machine-type communication devices, and the like. In the following description the term user communication device is used, which is intended to cover any type of such user equipment (mobile and stationary).

In an active or connected state a user communication device is registered with the network and has a Radio Resource Control (RRC) connection with a base station so that the network knows to which base station (or cell thereof) the user communication device belongs and can transmit data to and receive data from the user communication device. Each user communication device also establishes a default Evolved Packet System (EPS) Bearer (i.e. an end-to-end dedicated communication path) from the user communication device to an endpoint beyond the base station, typically a gateway (such as a packet data network gateway—'PDN-GW' or 'P-GW'—or the like), in the Enhanced Packet Core (EPC) network, or core network for short. An EPS Bearer, which is specific to the user communication device, defines a transmission path for IP packets through the network. The EPC assigns one or more IP addresses to the mobile communication device, at which it can be reached by other communication devices, such as another mobile communication device.

A Mobility Management Entity (MME) in the core network manages general mobility aspects of the user communication devices and ensures that connectivity is maintained with the user communication devices, for example as they are moving within the geographical area covered by the communication system (and/or as they are handed over between base stations of the communication system due to movement or changes in communication conditions). The MME also manages the various bearers associated with the user communication devices (such as an EPS bearer and/or the like) by controlling the other network nodes (e.g. P-GW, S-GW) via which such bearers are provided. In order to do so, the MME exchanges Non-Access Stratum (NAS) signalling messages with the user communication devices (and/or the other network nodes) to manage the establishment of a communication session.

As part of the Long Term Evolution (LTE) of UTRAN (UMTS Terrestrial Radio Access Network) referred to as E-UTRAN, proximity-based services (ProSe) have been introduced, which make use of direct device-to-device (D2D) communication bearers directly between compatible user communication devices rather than indirect bearers provided from one user communication device to another user communication device, via a base station and the core network (or via a base station when using locally routed indirect bearers), e.g. over a pair of EPS bearers (or over a pair of locally routed radio bearers). Thus, when a ProSe enabled user communication device is within the transmission range of (or served by the same base station as) another ProSe user communication device, they can communicate user data without the need to use core network resources and/or base station resources. Such services can be achieved by establishing a special, 'D2D', bearer between the user communication devices in direct communication instead of their default or other conventional EPS bearers (which might be still used for other types of communications). This direct routed communication could result in better utilization of the available resources, especially on the radio interface, where these are limited. Details of the ProSe functionality have been specified in the 3GPP Technical Report TR 23.703 and 3GPP Technical Specification TS 23.303 documents, the contents of which are incorporated herein by reference.

More recently the provision of a relay functionality, in the user communication device, using the ProSe functionality has been proposed to allow one user communication device (referred to as a 'UE-Relay' or 'UE-R') to relay the signalling and the user data for another user communication device to and from the network, even if the other user communication device is not located within the network's coverage. In this case, the relayed user communication device can communicate with the network (both user plane and control plane data) via the UE-R thus accessing to network services as if the relayed user communication devices were served by a base station of the network.

SUMMARY OF INVENTION

Technical Problem

In order to be able to benefit from ProSe services, a ProSe enabled user communication device performs a so-called discovery procedure (which can be done with or without network assistance/coverage), although ProSe services may be realised without such a discovery procedure as well. As part of this discovery procedure, each ProSe enabled user communication device transmits (e.g. periodically) a beacon for announcing itself to other such user communication devices in its proximity, and also listens for beacon transmissions by other devices. After two (or more) user communication devices have mutually discovered each other (e.g. they have received the other user communication device's beacon), they are able to start a ProSe communication session with each other.

A problem associated with UE based relaying (especially ProSe/D2D based relaying) is that a relayed user communication device cannot be perceived as connected to the network whilst communicating via the UE-R, even after the relayed user communication device has established an EPS bearer (and/or the like) towards another communication endpoint beyond the UE-R. Therefore, some mobility procedures cannot be performed for such relayed user communication devices since they are not connected to a base station (or to a base station and the core network) directly. In this situation, the network may not know that a user communication device is using the UE-R to connect to the network. Therefore, UE mobility procedures (which often require connected mode of operation) cannot be ensured for the relayed user communication device (whilst it connects to the network via a UE-R), since the relayed user communication device is not known by any base station, including the UE-R's serving base station.

In particular, the following RRC messages (and associated procedures) cannot be supported for relayed user communication devices whilst they connect via a UE-R:
"RRC Connection Request" message;
"RRC Connection Setup" message;
"RRC Connection Setup Complete" message;
"RRC Connection Reconfiguration" message;
"RRC Connection Reconfiguration Complete" message;
measurement commands (normally transmitted using RRC Connection Reconfiguration messages and/or the like);
"Measurement Report" messages; and/or
handover commands (normally transmitted using RRC Connection Reconfiguration messages).
In addition, the following NAS procedures (and messages) cannot be supported for relayed user communication devices whilst they connect via a UE-R:
NAS attach/detach procedure (e.g. "NAS Attach Request" message; "NAS Attach Complete" message; "PDN Connectivity Request" message; "NAS Detach Request" message; "NAS Detach Accept" message);
NAS information for Tracking Area Update procedure (e.g. "NAS TAU Request" message; "NAS TAU Accept" message);
NAS information procedure (e.g. "NAS Identity Request" message; "NAS Identity Response" message);
authentication procedure (e.g. "NAS Authentication Request" message; "NAS Authentication Response" message);
access to a service (for example, internet connectivity);
(default) bearer creation procedure (e.g. "Activate Default Bearer Context Request" message; "Activate Default EPS Bearer Context Accept" message); and/or
security configuration procedure (such as security mode procedures e.g. "NAS Security Mode Command" message; "NAS Security Mode Complete" message).

In order to address this problem, a possible option would be to implement the functions of an E-UTRAN base station (eNB) within the relaying UE (i.e. the UE-R) itself. However, this increases both the complexity and associated costs of such relaying user equipment and could reduce battery life considerably. This could also contravene a general need to allow the UE-R functionality to be provided via a conventional user communication device. This may thus make it more difficult for network operators (and end-users alike) to benefit from the various advantages offered by relaying, such as the added flexibility, lower investment needs, better signal quality, reduced interference, better resource allocation (or lack of coordination with other nodes).

Accordingly, preferred embodiments of the present invention aim to provide methods and apparatus which overcome or at least partially alleviate at least one of the above issues.

Solution to Problem

In one aspect, the invention provides a relaying user communication device for facilitating the provision of a communication link for another user communication device, the relaying communication device comprising means for communicating with said other user communication device and with a first base station, wherein said communicating means is operable to: i) communicate with said other communication device over a first interface; ii) communicate with said first base station over a second interface; iii) communicate, via said first interface, a message for initiating provision of a communication link; iv) communicate with a core network, responsive to said message, to establish said communication link from said other user communication device, via said first interface and said second interface, to a second base station, the second base station being remote from said relaying user communication device; and v) relay data, for said other user communication device, via said first interface and said second interface, using said communication link when established.

The message for initiating provision of a communication link might comprise at least one of: a request for registering said other user communication device with said relaying user communication device; and a request for establishing a bearer for said other user communication device via said relaying user communication device. The message might comprise a protocol data unit (PDU) specific to the first interface (e.g. a ProSe PDU).

The message might include at least one of: information identifying said relaying user communication device (e.g. a corresponding layer 2 identifier, L2-id); information identifying said other user communication device (e.g. a corresponding L2-id); and one or more parameter specific to said other user communication device (e.g. a globally unique temporary identity, GUTI).

The communicating means might be operable to, in response to said message for initiating provision of a communication link, obtain information (e.g. an access point name, APN) identifying said second base station, and operable to establish a bearer for said other user communication device with a core network entity serving said relaying user communication device for communicating with said second base station.

The message for initiating provision of a communication link might comprise at least one of: a request for establishing a dedicated bearer, for said other user communication device, via said relaying user communication device; and a request to reuse an existing bearer, for said other user communication device, via said relaying user communication device.

The communicating means might be operable to, in response to said request for establishing a dedicated bearer for said other user communication device, establish a dedicated bearer for said other user communication device with a core network entity (e.g. a packet data network, PDN, gateway) serving said relaying user communication device.

The communicating means might be operable to establish an internet protocol (IP) connection with said second base station over said dedicated bearer established with said core network entity. The communication link from said other user communication device to said second base station might comprise a layer 2 link. The communication link from said other user communication device to said second base station might comprise a packet data convergence protocol (PDCP) connection. The first interface might comprise a device-todevice (D2D) bearer. The second interface might comprise an Evolved Packet System (EPS) bearer.

The relayed data might comprise at least one of: radio resource control (RRC) signalling; non-access stratum (NAS) signalling; and internet protocol (IP) signalling. The communicating means might be operable to receive, via one of said first interface and said second interface, said data in at least one protocol data unit (PDU) and to relay said data by forwarding said PDU over the other one of said first interface and said second interface.

The communicating means might be operable to receive said at least one PDU via said first interface, and said other user communication device might be operable to initiate establishment of an RRC connection with said second base station by including, in said at least one PDU, an appropriately formatted signalling message (e.g. an RRC connection request message) for said second base station.

The communicating means might be operable to receive said at least one PDU via said first interface, and said other user communication device might be operable to initiate establishment of an NAS connection with a mobility management entity (MME) by including in said at least one PDU an appropriately formatted signalling message (e.g. a NAS signalling message) to said second base station.

The relaying user communication device might comprise user equipment in accordance with the long term evolution (LTE) set of standards.

In one aspect, the invention provides a user communication device for communicating, over a relayed communication link in a communication network comprising a first base station and a second base station, the user communication device comprising means for communicating with a relaying user communication device connected to said first base station and, via said relaying user communication device, with said second base station wherein said second base station is remote from said relaying user communication device, wherein said communicating means is operable to: i) communicate with said relaying user communication device over a first interface; ii) send, via said first interface, to said relaying user communication device, a message for initiating provision of a communication link with the second base station; iii) establish a communication link with said second base station, via said relaying user communication device; and iv) communicate data with said second base station over said communication link, via said relaying user communication device, when established.

The message for initiating provision of a communication link might comprise at least one of: a request for registering said user communication device with said relaying user communication device; a request for establishing a dedicated bearer for said user communication device via said relaying user communication device; and a request to reuse an existing bearer, for said other user communication device, via said relaying user communication device. The message might comprise a protocol data unit (PDU) specific to said first interface (e.g. a ProSe PDU).

The message might include at least one of: information identifying said user communication device (e.g. a corresponding layer 2 identifier, L2-id); information identifying said relaying user communication device (e.g. a corresponding L2-id); and one or more parameter specific to said user communication device (e.g. a globally unique temporary identity, GUTI).

The message might be configured to cause said relaying user communication device to establish a bearer for said user communication device with a core network entity serving said relaying user communication device for communicating with said second base station. The message for initiating provision of a communication link might comprise a request for establishing a dedicated bearer for said user communication device via said relaying user communication device. In this case, the communicating means might be operable to, in response to said request for establishing a dedicated bearer for said other user communication device, establish a dedicated bearer for with a core network entity (e.g. a packet data network, PDN, gateway) serving said relaying user communication device. The communicating means might be operable to establish an internet protocol (IP) connection with said second base station over said dedicated bearer established with said core network entity.

The dedicated bearer might comprise an Evolved Packet System (EPS) bearer. The first interface might comprise a device-to-device (D2D) bearer. The communication link might comprise a layer 2 link with said second base station. The communication link might comprise a packet data convergence protocol (PDCP) connection with said second base station.

The data communicated with said second base station might comprise at least one of: radio resource control (RRC) signalling; non-access stratum (NAS) signalling; and internet protocol (IP) signalling.

The communicating means might be operable to communicate, via said first interface, said data in at least one protocol data unit (PDU) wherein said at least one PDU might be relayed by said relaying user communication device over a second interface via said first base station. In this case, the communicating means might be operable to initiate establishment of an RRC connection with said second base station by including in said at least one PDU an appropriately formatted signalling message (e.g. an RRC connection request message) to said second base station. The communicating means might be operable to initiate establishment of a NAS connection with a mobility management entity (MME) by including in said at least one PDU an appropriately formatted signalling message (e.g. a NAS signalling message) to said second base station.

The user communication device might comprise user equipment in accordance with the long term evolution (LTE) set of standards.

In one aspect, the invention provides a base station for communicating with a relayed user communication device, the base station comprising means for communicating with a relaying user communication device connected to a base station and, via said relaying user communication device, with said relayed user communication device, wherein said communicating means is operable to: i) communicate with said relaying user communication device over a first interface; ii) communicate, via said first interface, with said relaying user communication device, a message for initiating provision of a communication link for said relayed user communication device; iii) establish a communication link with said relayed user communication device, via said relaying user communication device; and iv) communicate data with said relayed user communication device over said communication link, via said relaying user communication device, when established.

The message for initiating provision of a communication link might comprise at least one of: a request for establishing a bearer for said relayed user communication device via said relaying user communication device; and a request to reuse an existing bearer, for said other user communication device, via said relaying user communication device.

The communicating means might be operable to establish an internet protocol (IP) connection with said relaying user communication device. The communication link might comprise a layer 2 link with said relayed user communication device. The communication link might comprise a packet data convergence protocol (PDCP) connection with said relayed user communication device.

The data communicated with said relayed user communication device might comprise at least one of: radio resource control (RRC) signalling; non-access stratum (NAS) signalling; and internet protocol (IP) signalling.

The communicating means might be operable to communicate, via said first interface, said data in at least one protocol data unit (PDU) wherein said at least one PDU might be relayed by said relaying user communication device over a second interface (e.g. a device-to-device, D2D, interface) with said relayed user communication device. In this case, the communicating means might be operable to receive said at least one PDU from said relayed user communication device, and to establish an RRC connection with said relayed user communication device, via said relaying user communication device, in accordance with an appropriately formatted signalling message (e.g. an RRC connection request message) included in said at least one PDU received from said relayed user communication device. The communicating means might be operable to receive said at least one PDU from said relayed user communication device, and wherein said communicating means might be operable to initiate establishment of an NAS connection with a mobility management entity (MME) based on an appropriately formatted signalling message (e.g. a NAS signalling message) included in said at least one PDU received from said relayed user communication device.

The base station might comprise means for detecting control-plane signalling (e.g. NAS signalling) in said at least one PDU received from said relayed user communication device; and said communicating means might be operable to forward said control-plane signalling to a core network entity (e.g. a mobility management entity, MME) upon said detecting means detecting said control-plane signalling in said at least one PDU.

The base station might be provided in a network associated with said relayed user communication device. The base station might be provided in a core network portion of said network associated with said relayed user communication device. The base station might be configured to implement a subset of the functionalities of said second base station. The base station might comprise a network node (e.g. an eNB) in accordance with the long term evolution (LTE) set of standards.

In one aspect, the invention provides a relaying user communication device for facilitating the provision of a communication link for another user communication device, the relaying communication device comprising transceiver circuitry for communicating with said other user communication device and with a first base station, wherein said transceiver circuitry is configured to: i) communicate with said other communication device over a first interface; ii) communicate with said first base station over a second interface; iii) communicate, via said first interface, a message for initiating provision of a communication link; iv) communicate with a core network, responsive to said message, to establish said communication link from said other user communication device, via said first interface and said second interface, to a second base station, the second base station being remote from said relaying user communication device; and v) relay data, for said other user communication device, via said first interface and said second interface, using said communication link when established.

In one aspect, the invention provides a user communication device for communicating, over a relayed communication link in a communication network comprising a first base station and a second base station, the user communication device comprising transceiver circuitry for communicating with a relaying user communication device connected to said first base station and, via said relaying user communication device, with said second base station wherein said second base station is remote from said relaying user communication device, wherein said transceiver circuitry is configured to: i) communicate with said relaying user communication device over a first interface; ii) send, via said first interface, to said relaying user communication device, a message for initiating provision of a communication link with the second base station; iii) establish a communication link with said second base station, via said relaying user communication device; and iv) communicate data with said second base station over said communication link, via said relaying user communication device, when established.

In one aspect, the invention provides a base station for communicating with a relayed user communication device, the base station comprising transceiver circuitry for communicating with a relaying user communication device connected to a base station and, via said relaying user communication device, with said relayed user communication device, wherein said transceiver circuitry is configured to: i) communicate with said relaying user communication device over a first interface; ii) communicate, via said first interface, with said relaying user communication device, a message for initiating provision of a communication link for said relayed user communication device; iii) establish a communication link with said relayed user communication device, via said relaying user communication device; and iv) communicate data with said relayed user communication device over said communication link, via said relaying user communication device, when established.

In one aspect, the invention provides a system comprising the above described relaying user communication device, the above described user communication device, and the above described base station.

Aspects of the invention extend to corresponding methods and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Advantageous Effects of Invention

According to the Invention, one or more of the above-mentioned problems is/are ameliorated or overcome.

DESCRIPTION OF EMBODIMENTS

Figure 1:
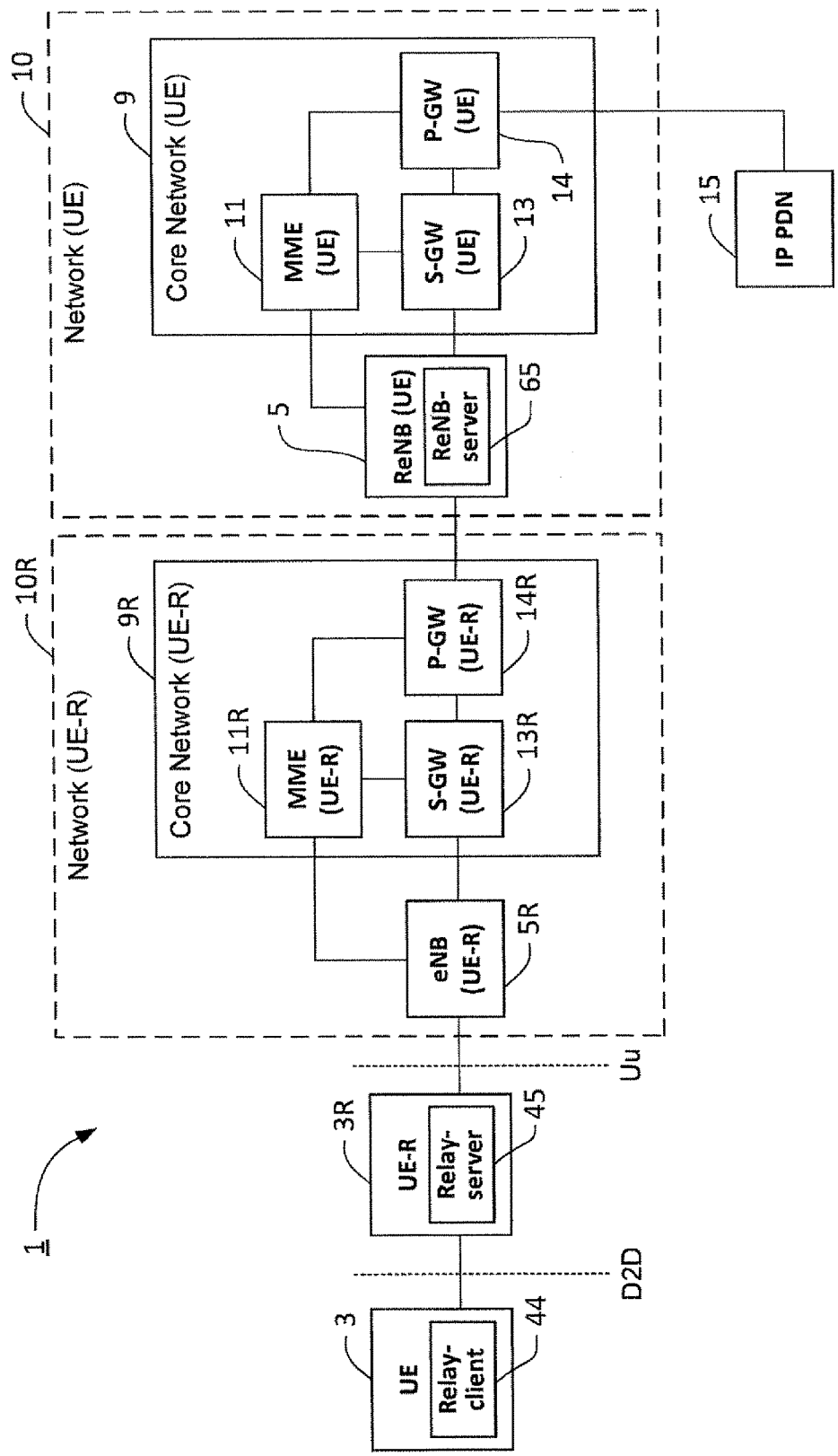
FIG. 1 illustrates schematically a cellular communication system to which embodiments of the invention may be applied.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Embodiments of the invention will now be described, by way of example, with reference to the accompanying drawings, in which:

FIG. 1 schematically illustrates a communication network 1 in which user equipment (such as a mobile or other user communication device 3) can communicate with other user equipment and/or remote servers via relaying user equipment (such as the user communication device (UE-R) 3R), base station 5R serving the relaying user equipment 3R, and a core network 9R to which the base station 5R is coupled. In this example, the user communication devices 3 and 3R are being served by respective relayed UE serving and UE-R serving (sub-)networks, denoted 'Network (UE)' 10 and 'Network (UE-R)' 10R.

Communication between the relaying user communication device 3R and its serving network 10R takes place via one or more base stations (e.g. eNB 5R). The base station 5R is coupled to the core network 9R using an appropriate interface, which might utilise, for example, a high speed, high bandwidth communication link, such as an optical fiber link and the like. Similarly, the base station 5 is coupled to the core network 9 using an appropriate interface, which might utilise, for example, a high speed, high bandwidth communication link, such as an optical fiber link and the like. The core networks 9 and 9R are also coupled to other networks (e.g. the Internet) via one or more gateways.

In this embodiment, the core networks 9 and 9R include, amongst other things, a plurality of mobility management entities (MMEs) 11, 11R, serving gateways (S-GWs) 13, 13R, and Packet Data Network (PDN) Gateways (P-GWs) 14, 14R. Of these core network entities: the relayed UE serving network 10 comprises an MME 11, an S-GW 13 and a P-GW 14 for serving the relayed UE 3; and the UE-R serving network 10R comprises an MME 11R, an S-GW 13R and a P-GW 14R for serving the UE-R 3R.

Advantageously, in this embodiment, the relayed UE serving network 10 also comprises a 'remote' base station (ReNB) 5 for serving the relayed UE 3 (and possibly other relayed UEs).

In the UE-R serving network 10R the MME 11R manages mobility aspects of the user communication device 3R and maintains connectivity with the user communication device 3R as it moves between serving base stations, for example as a result of movement within the geographical area covered by the communication system 1. The MME 11R also manages the various bearers associated with the user communication device 3R.

The S-GW 13R connects the base station 5R (and hence the relaying user communication device 3R) to the core network 9R for communicating user data for that user communication device 3R (and for any further user communication devices connected to the UE-R 3R). The bearer (e.g. a default EPS bearer) for the user communication device 3R normally terminates at the P-GW 14R of the core network 9R, although the EPS bearer can be complemented by another, internal or external bearer between the P-GW 14R and another communication end-point within or external to the core network 9R. In this embodiment, for example, the P-GW 14R has a bearer, complementing the EPS bearer, having an end-point at the ReNB 5 of the relayed UE serving network 10.

In the relayed UE serving network 10, the MME 11 manages mobility aspects of the user communication device 3 (regardless whether or not that particular user communication device is being relayed) and maintains connectivity with the user communication device 3 as it moves between serving base stations, for example as a result of movement within the geographical area covered by the communication system 1. The MME 11 also manages the various bearers associated with the user communication device 3.

The networks 10, 10R are also coupled to one or more external networks, such as an IP PDN 15.

The user communication devices 3 and 3R shown in FIG. 1 are each equipped with ProSe functionality, thus they can establish one or more direct communication bearers, or D2D bearers for short, with each other (assuming they are within each other's vicinity and they have performed an appropriate discovery/connection procedure). A D2D bearer may have an associated Traffic Flow Template (TFT) information that allows identification of the direct communication bearer provided between the relayed user communication device 3 and the UE-R 3R. Each direct communication bearer may have different characteristics of the communications (e.g. quality of service, modulation, transmit power, etc.) required/agreed for that direct communication bearer.

In FIG. 1, the relaying user communication device 3R is provided with a relaying functionality to allow data to be relayed between other user equipment and the base station 5R (denoted 'eNB') and/or other network nodes via the base station 5R. Thus, the relayed user communication device 3 can also access and be served by its associated network 10 via the UE-R 3R (and the base station 5R), using an associated bearer with the network 10 (e.g. an EPS bearer) relayed through the UE-R 3R.

In this example, the UE-R 3R beneficially comprises a relay-server 45 function, which facilitates communication between a corresponding relay-client 44 function (in the UE 3) and the remote base station (ReNB) 5 in the network 10 serving the relayed user communication device 3. The ReNB 5 comprises an IP server having an associated ReNB-server function 65 that is accessible using the UE-R's 3R user-plane connection, such as an appropriate IP transport connection between the UE-R 3R and the ReNB 5. In this embodiment, whilst the ReNB 5 provides many functions that are similar to those of a conventional base station (such as base station 5R), the ReNB 5 is, in effect, a 'virtual' base station that does not (in this example) have the full functionality of a conventional base station. For example, the ReNB 5 does not have the hardware/software to support its own physical cell and serve its own mobile devices directly (i.e. without relaying).

Specifically, in this embodiment, an end-to-end Layer 2 link is provided between the relayed user communication device 3 and the ReNB 5 (via the UE-R's 3R) for conveying control-plane and user-plane Packet Data Units (PDUs) between them. The Layer 2 link is provided via the device-to-device bearer between the relayed user communication device 3 and the UE-R 3R, and via an associated IP transport connection between the UE-R 3R and the ReNB 5. The Layer 2 link can be seen as a tunnel established between the relayed user communication device 3 and the ReNB 5. Above the Layer 2 link, protocols such as PDCP can be established, as well as higher layer protocols as like RRC (Radio Resource Control) and NAS (Non Access Stratum).

Advantageously, the provision of the Layer 2 link via the UE-R 3R (e.g. over the UE-R's 3R user-plane connection) makes it possible to provide network services to the UE 3 with the help of UE-Relay based relaying services without sacrificing the mobility management aspects for the relayed UE 3 and also without the complexity, and other undesirable effects, of providing an eNB function in the UE-R 3R. In particular, this arrangement beneficially allows the network 10 (of the UE 3) to perceive the relayed user communication device 3 as being in a connected state (e.g. an RRC connected or 'active' state) even when the UE 3 is connected to the UE-R 3R using a D2D bearer. This is made possible because the Layer 2 link allows relaying of the PDCP PDU and the setup of a PDCP protocol between UE 3 and ReNB 5, that further allow the exchange of Layer 3 signalling (e.g. control-plane signalling) between the UE 3 and its serving network. Hence, for example, it is possible to exchange RRC signalling between the UE 3 and the ReNB 5 and/or to relay NAS signalling between the UE 3 and the MME 11 and thereby re-use any existing RRC/NAS procedures for the relayed user communication device 3. Accordingly, from the network's point of view, the relayed user communication device 3 can be operated in an RRC-Connected mode and/or in an ECM-Connected mode even when a D2D bearer is involved.

Advantageously, this approach has no (or it has only minimal) impact on the EPS bearer of the UE-R 3R. Effectively, the UE-R 3R can use any suitable EPS bearer (and/or the like) that it has with the network and that can be used for communication with an IP server, such as the ReNB 5. Moreover, one or more shared EPS bearers can be used by the UE-R 3R, with each shared EPS bearer supporting a plurality of relayed UEs. Further, the UE-R 3R needs to implement only such functionalities that are relevant to relaying control signalling for the (or each) UE 3. In this case, when the user communication device 3 is being relayed, it can use its relay-client 44 to communicate with an associated ReNB 5 (e.g. an appropriate ReNB-server function 65 provided by an IP server). Accordingly, the ReNB 5 may not need to be a conventional base station (such as the eNB 5R). For example, the ReNB 5 may be implemented as part of any suitable network entity (or as a separate entity).

In summary, there is no need to implement extensive (or complete) base station (eNB) functionalities in the relaying user communication device 3R, only some relay functionalities, since such eNB functionalities may be provided by a ReNB 5 entity in the network serving the user communication device 3. This in turn reduces the complexity of the relaying user equipment 3R without sacrificing on the mobility handling (e.g. RRC/NAS signalling) that can be provided between the relayed user communication device 3 and its associated network entities (e.g. ReNB 5/MME 11). The provision of the ReNB 5 entity having an associated ReNB-server 65 functionality may advantageously allow the configuration of any conventional (standard compliant) user equipment to operate as the relaying user communication device 3R (once an associated relay-server 45 functionality is provided/enabled) for the purpose of maintaining connectivity between a relayed user communication device and its serving network.

The above system may be particularly advantageous when the relayed user communication device 3 is located out of range of the base station(s) of the communication network 1 (but whilst located within the range of the UE-R 3R).

System Architecture

Figure 2:
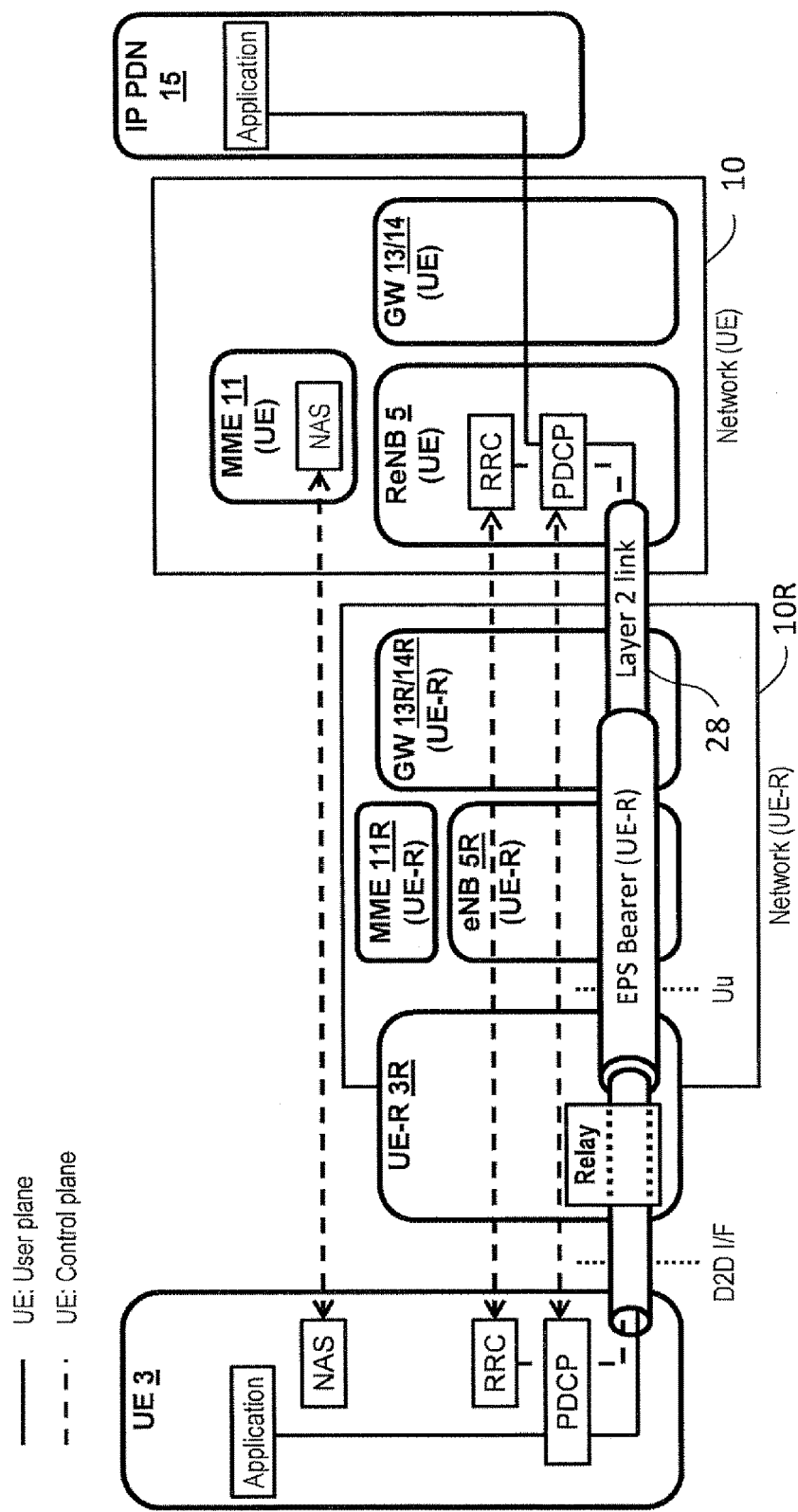
FIG. 2 illustrates schematically the relaying functionality in the system shown in FIG. 1.

FIG. 2 illustrates the proposed system architecture in more detail. In particular, FIG. 2 illustrates the UE-R 3R configured for relaying of signalling (e.g. user-plane and/or control-plane data) between the user communication device 3 and an associated ReNB 5 over a Layer 2 link 28 and using the UE-R's 3R EPS bearer (and/or the like). It will be appreciated that an appropriate external/internal bearer may also be provided to complement the EPS bearer towards the network 10 in which the ReNB 5 is located, however, such external/internal bearer has been omitted for clarity.

As can be seen, the UE-R 3R is connected to (served by) the network infrastructure 10R, which comprises the base station 5R, the MME 11R, and the gateways 13R/14R.

The other user communication device 3 is connected to the UE-R 3R via an appropriate D2D interface (e.g. using a ProSe radio bearer). The network infrastructure 10 serving the user communication device 3 comprises the ReNB 5, the MME 11, and the gateways 13/14.

However, in this case, the user communication device 3 is not connected directly to a serving base station via an appropriate radio bearer. Instead, the user communication device 3 is connected to a so-called remote eNB 5 or ReNB 5 network entity, using a Layer 2 link 28. The Layer 2 link 28 is established through the UE-R 3R, the base station 5R serving the UE-R 3R, and the gateways 13R/14R. The Layer 2 link 28 established between the relayed user communication device 3 and the ReNB 5 can be regarded as being analogous to a regular radio link composed on the MAC and PHY layers between user equipment and a serving base station operating in accordance with the 3GPP TS 36.300 standard. Accordingly, the ReNB 5, using the Layer 2 link, is able to provide similar (or the same) functionality to the relayed user communication device 3, as a standard eNB to a non-relayed UE.

Although not necessarily shown in FIG. 2, in order to facilitate communication via the Layer 2 link 28, relay-server functionality is provided in the UE-R 3R, relay-client functionality is provided in the user communication device 3, and ReNB-server functionality is provided in the ReNB 5.

Figure 3:
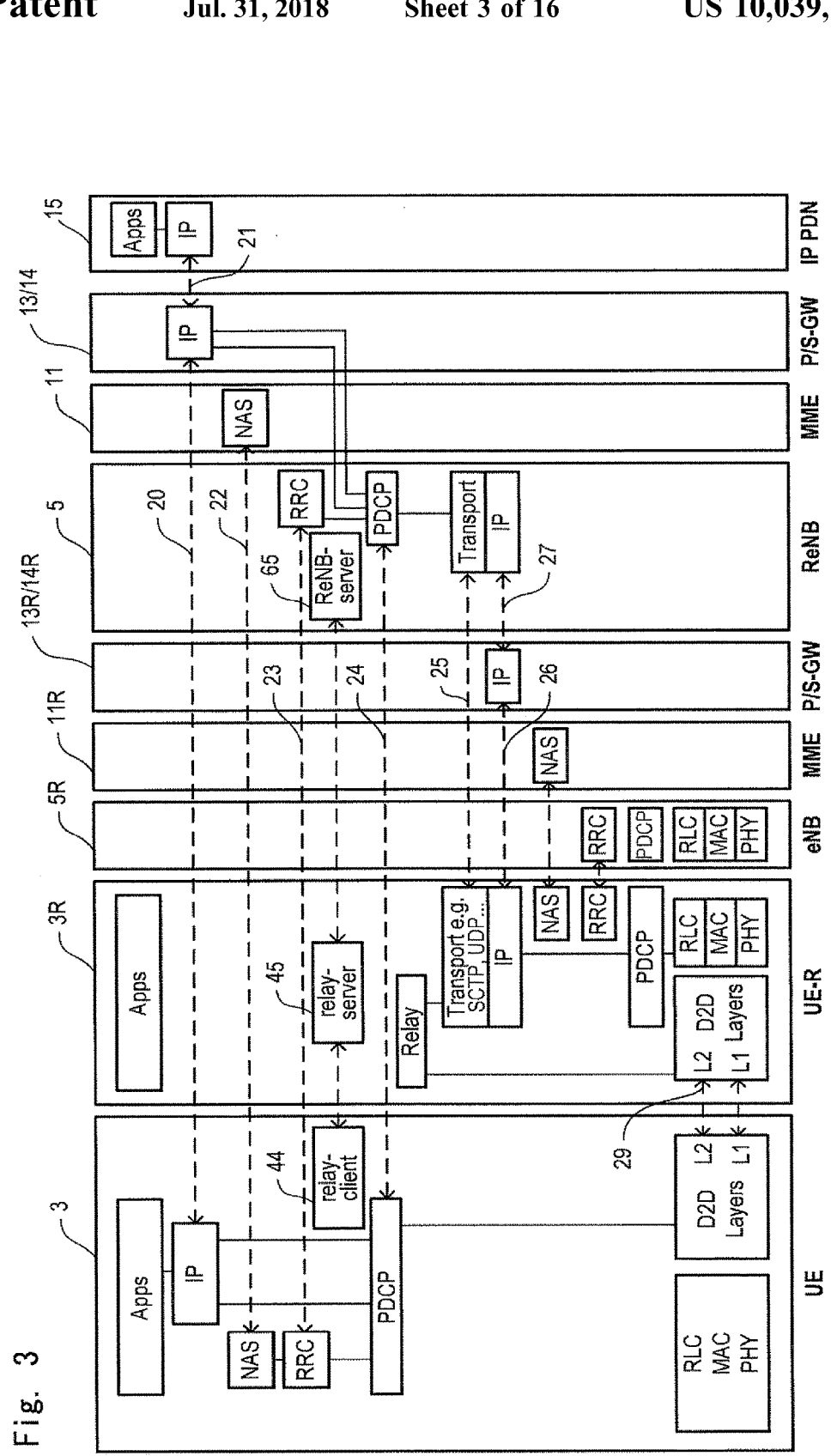
FIG. 3 illustrates schematically a protocol architecture in the system shown in FIG. 1.

FIG. 3 illustrates schematically the various layers and protocols of the entities shown in FIG. 1, and the various associations between different entities (and corresponding layers thereof) that may communicate with each other using such layers and protocols.

As can be seen, there is an end-to-end IP connection 20 (e.g. an EPS bearer) provided between the relayed user communication device 3 and its associated gateway (e.g. P-GW 14), which is also complemented by an external bearer 21 towards an endpoint in an external network (e.g. a node in the IP PDN 15).

The end-to-end IP connection 20 between the relayed user communication device 3 and its associated gateway (e.g. P-GW 14) may be provided over an EPS bearer established by the MME 11. This EPS bearer is supported by an E-RAB established between the relayed user communication device 3 and the S-GW 13 and an S5/S8 bearer established between the S-GW 13 and the P-GW 14. Further details of the IP connection 20 and its associated bearers are given with reference to FIG. 4 below.

An end-to-end NAS connection 22 is provided between the relayed user communication device 3 and its associated MME 11, and an end-to-end RRC connection 23 is provided between the relayed user communication device 3 and its associated ReNB 5. As described above, the RRC/NAS signalling (and/or any IP signalling) is tunnelled using a Layer 2 link 28 between the user communication device 3 and the ReNB 5. The PDU transported over the end-to-end IP connection 20, or over the RRC end-to-end RRC connection 23 are transported using an optional PDCP protocol connection 24 established between the relayed user communication device 3 and ReNB 5, using the Layer 2 link 28 formed by the D2D link 29, the relay functionality in 3R, and the link 25.

The Layer 2 link 28 is established using the respective relay-client 44, relay-server 45, and ReNB-server 65 functions provided at the relayed user communication device 3, the UE-R 3R, and the ReNB 5, respectively.

The UE-R 3R also has its own IP connection 26 (e.g. an EPS bearer) to its own gateway (P-GW 14R), which is also complemented by a corresponding external bearer 27 towards other networks, in this example, to the network of the ReNB 5 (if different than the UE-R's 3R network). If the ReNB 5 is located in the same network as the UE-R's 3R network, an appropriate internal bearer (e.g. another EPS bearer) may be used instead of an external bearer 27 between the IP layers of the P-GW 14R and the ReNB 5.

The UE-R 3R also maintains a pair of associated RRC and NAS connections to its serving base station 5R and MME 11R, respectively.

There is also an appropriate D2D bearer 29 (e.g. a ProSe bearer) established between the relayed mobile communication device 3 and the UE-R 3R (over Layer 2) that is coupled (relayed) to a link 25 between the UE-R 3R and the ReNB 5 (using e.g. the UE-R's 3R IP connection 26 and external bearer 27). Thus, using the above described architecture, data may be exchanged between an application (denoted 'Apps' in FIG. 3) running on the relayed user communication device 3 and a corresponding application in the IP PDN 15 by sending the data to the IP layer, from where it is (optionally) passed down to the PDCP layer (if present), and then to the layer(s) responsible for communications over the D2D bearer 29.

The data received from higher layers is forwarded over the D2D bearer 29 to the UE-R 3R, then the data is relayed over the link 25 to the ReNB 5, where it is passed to the PDCP layer for processing (i.e. if PDCP is used). From the ReNB's 5 PDCP layer (or, if PDCP is not used, directly from the transport layer of the ReNB 5), the data is passed to the gateway(s) 13/14 serving the relayed user communication device 3 and from the P-GW 14 to the IP PDN 15, where it is delivered to the appropriate application (e.g. based on a destination IP address associated with the data).

Similarly, RRC/NAS signalling can be communicated using the same path as for application data between the relayed user communication device 3 and the PDCP layer of the ReNB 5, from where the signalling is passed to the RRC layer (in case of RRC signalling) or to the MME 11 (in case of NAS signalling) rather than being forwarded to the IP PDN 15.

Accordingly, whilst communication between the relayed UE 3 and other nodes is completely transparent for the UE-R 3R, data and signalling can be delivered to the appropriate destination node without compromising on the mobility support and connectivity that can be provided by the network for the relayed user communication device 3.

End-to-End Service Architecture

Figure 4:
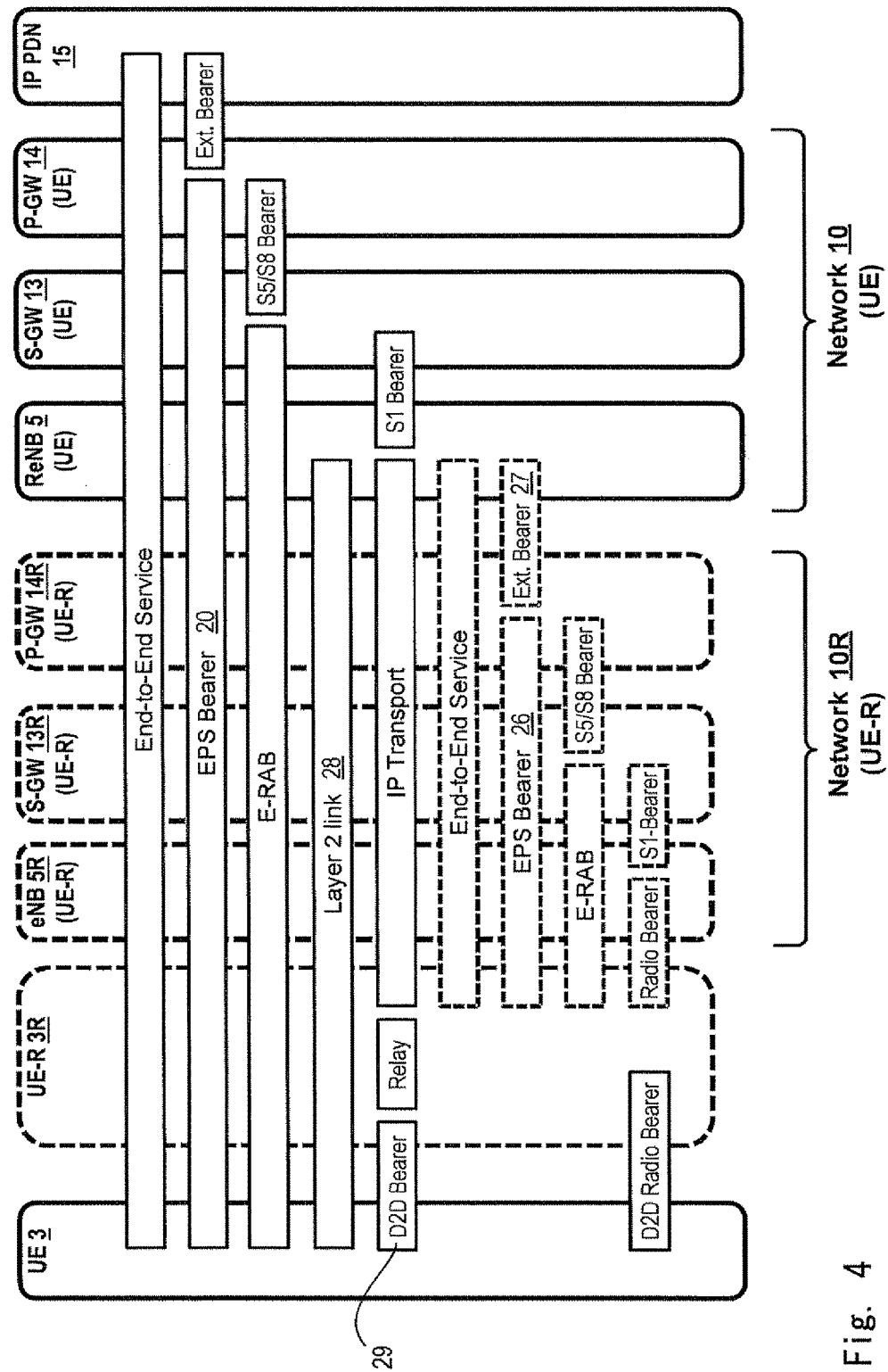
FIG. 4 illustrates schematically an exemplary user plane architecture for providing an end-to-end service in the system shown in FIG. 1.

FIG. 4 illustrates schematically a bearer architecture in which a Layer 2 link 28 is provided for communicating data between a user communication device 3 and the associated ReNB 5 when D2D relaying is in place. As can be seen, from top to down, an end-to-end service can be provided between two communication endpoints (e.g. between a user communication device 3 and an application in the IP PDN 15) over an associated EPS bearer 20 (and/or the like). The EPS bearer 20 may be complemented by an external bearer when, as in this example, the other endpoint is located outside the core network 9 (in which P-GW 14 is located).

Such an EPS bearer 20 is provided using an associated E-RAB bearer between the user communication device 3 and its S-GW 13, and using S5/S8 bearer between the S-GW 13 and the P-GW 14.

The associated E-RAB bearer is realised by the Layer 2 link 28 and an S1 bearer provided between the ReNB 5 and the S-GW 13 (i.e. the gateway serving the relayed UE 3). The Layer 2 link 28 is composed of an appropriate L2 D2D (e.g. ProSe) bearer 29 established between the user communication device 3 and the UE-R 3R and an associated link 25 provided between the UE-R 3R and the ReNB 5. As can be seen, relaying of data between the D2D bearer and the link 25 is performed within the UE-R 3R. Thus, effectively, from the point of view of the relayed user communication device 3, the Layer 2 link 28 may be regarded as a tunnel for transporting PDUs between the relayed user communication device 3 and the ReNB 5.

The link 25 between the respective transport layers of the UE-R 3R and the ReNB 5 may be implemented e.g. using a suitable transport protocol, such as SCTP, TCP, UDP, RTP and/or the like. Such suitable transport protocol may be provided over an IP layer established between the UE-R 3R and the S/P-GW 13R/14R through an IP link 26 (e.g. an EPS bearer), and between the P-GW 14R and the ReNB 5 through another IP link 27 (e.g. an external bearer). Alternatively, the transport protocols may be directly provided by the IP layer.

The remaining bearers (shown using dashed lines) comprise bearers (e.g. regular/default bearers) established for the UE-R 3R for the provision of communication between the UE-R 3R and other nodes. Accordingly, such (UE-R specific) bearers may be used generally for communications between the UE-R 3R and the ReNB 5 via the network entities serving the UE-R 3R.

As can be seen, an end-to-end service can be provided between the relaying user communication device 3R and the ReNB 5 over an associated (UE-R specific) EPS bearer 26 (and/or the like) and a complementary bearer (e.g. an external bearer 27 when the ReNB 5 is located outside the network 10R serving the UE-R 3R).

The UE-R's 3R EPS bearer 26 is provided using an associated E-RAB bearer between UE-R 3R and S-GW 13R and a complementary S5/S8 bearer between S-GW 13R and the P-GW 14R. The E-RAB bearer for the UE-R 3R is further provided over an associated Radio bearer and an S1 bearer. The Radio bearer extends between the UE-R 3R and its serving base station 5R, and it is complemented by the S1 bearer between the serving base station 5R and the S-GW 13R (i.e. the gateway serving the UE-Relay 3R).

Any data received using the UE-R's 3R bearers and that is intended for the relayed user communication device 3 are passed to the relayed user communication device 3 using an associated D2D radio bearer (normally corresponding to an L1 bearer), from where it is passed on to higher layers (and vice versa).

Beneficially, using the bearer architecture of FIG. 4, it is possible to provide an RRC connection between the ReNB 5 and the relayed user communication device 3 (and hence to treat the relayed UE 3 as being connected to the network) without requiring the UE-R 3R to implement base station (eNB) functionality. Similarly, an appropriate NAS connection can also be provided between the MME 11 and the relayed user communication device 3 to support mobility related signalling for the relayed user communication device 3.

User Communication Device

Figure 5:
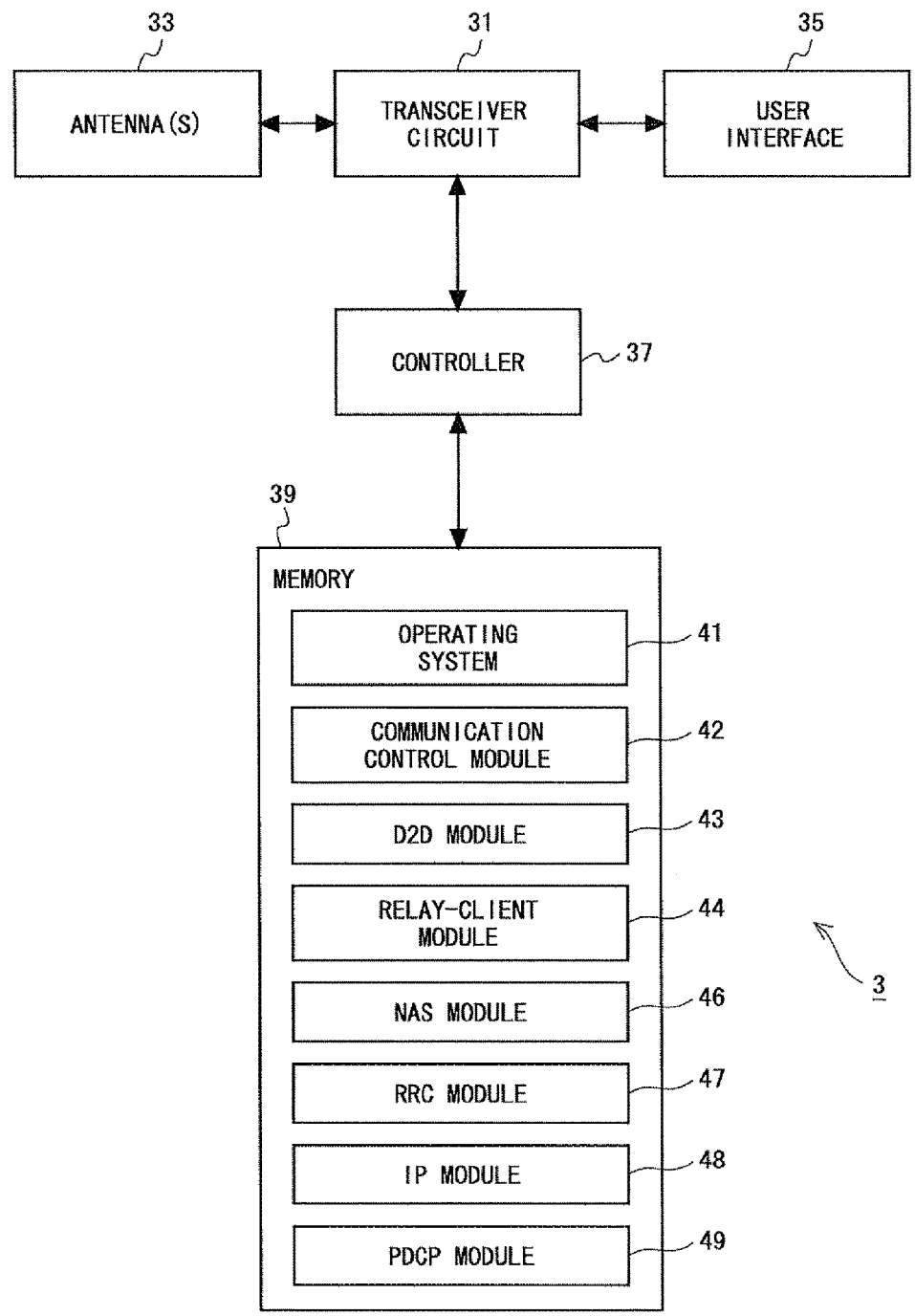
FIG. 5 is a functional block diagram illustrating some of the functionality of a user communication device forming part of the system shown in FIG. 1.

FIG. 5 is a functional block diagram illustrating some of the functionality of a user communication device 3 (e.g. the relayed user communication device 3 shown in FIG. 1). As shown, the user communication device 3 has a transceiver circuit 31 that is operable to transmit signals to and to receive signals from a base station and/or other user communication devices via one or more antenna 33. The user communication device 3 has a controller 37 to control the operation of the user communication device 3. The controller 37 is associated with a memory 39 and is coupled to the transceiver circuit 31. Although not necessarily shown in FIG. 5, the user communication device 3 will of course have all the usual functionality of a conventional user communication device (such as a user interface 35) and this may be provided by any one or any combination of hardware, software and firmware, as appropriate. Software may be pre-installed in the memory 39 and/or may be downloaded via the communication network or from a removable data storage device (RMD), for example.

The controller 37 is configured to control overall operation of the user communication device 3 by, in this example, program instructions or software instructions stored within the memory 39. As shown, these software instructions include, among other things, an operating system 41, a communication control module 42, a device-to-device (D2D) module 43, a relay-client module 44, a NAS module 46, an RRC module 47, an IP module 48, and a PDCP module 49. It will be appreciated that one or more of the modules 43 to 49 may not be present (or may not be operational) depending on the type of communication between the user communication device 3 and the corresponding other communication endpoint (e.g. base station, MME, P-GW, another UE, etc.).

The communication control module 42 handles (e.g. generates, sends and receives) control signals for controlling the connections between the user communication device 3 and other user communication devices, base stations, or the core network entities. The communication control module 42 also controls the separate flows of uplink/downlink data and signalling that are to be transmitted to/from the other user communication devices, base stations, and the core network entities.

The device-to-device module 43 is operable to assist the communication control module 42 in setting up a device-to-device communication path (e.g. ProSe based) to other compatible user equipment in the vicinity of the user communication device 3 (e.g. following an appropriate discovery procedure). The device-to-device module 43 may have both L1 and L2 functionality and communicates (e.g. user-plane or control-plane data) with corresponding device-to-device modules of other communication devices using appropriately formatted D2D (e.g. ProSe) PDUs.

The relay-client module 44 communicates (using the services of the device-to-device module 43) with the relay-server module 45 of the UE-Relay 3R and the ReNB-server module 65 of the ReNB 5 serving the user communication device 3 in order to establish the Layer 2 link(s) 28 between the UE 3 and the ReNB 5. The relay-client module 44 may be considered as a control module for the initiation, establishment, and maintenance of communication between the various other modules (layers).

The NAS module 46 handles (e.g. generates, sends and receives) Non-Access Stratum signalling messages in conformance with the relevant 3GPP (e.g. LTE) standards. In particular, the NAS module 46 communicates with, amongst others, the MME 11 serving the user communication device 3.

The RRC module 47 handles (e.g. generates, sends and receives) Radio Resource Control signalling messages in conformance with the relevant 3GPP (e.g. LTE) standards. In particular, the RRC module 47 communicates with, amongst others, the ReNB 5 (and/or the UE-R 3R) serving the user communication device 3.

The IP module 48 handles (e.g. generates, sends and receives) data packets conforming to the Internet Protocol standards (e.g. IPv4, IPv6, Mobile IP, etc.). In particular, the IP module 48 communicates with, amongst others, the P-GW 14 serving the user communication device 3, with the IP PDN 15 (via the P-GW 14), and/or corresponding IP modules 48 of other communication nodes. Although not shown in FIG. 5, the IP module 48 may include a user-plane sub-module (for user data) and/or a control-plane sub-module (for control data), where appropriate. The IP module 48 may also include one or more sub-modules for realising an appropriate IP transport protocol such as TCP, SCTP, UDP, RTP and/or the like.

The PDCP module 49 (which is optional) performs various services associated with the PDCP layer, in particular, services related to mobility and/or security. If present, the services performed by the PDCP module 49 include, amongst others: ciphering/deciphering, header compression/decompression, in-sequence packet delivery, duplicate detection, and/or packet retransmission services. Although not shown in FIG. 5, the PDCP module 49 may include a user-plane sub-module (for user-plane PDCP functions)

and/or a control-plane sub-module (for control-plane PDCP functions), where appropriate.

User Communication Device (Configured as a UE-R)

Figure 6:
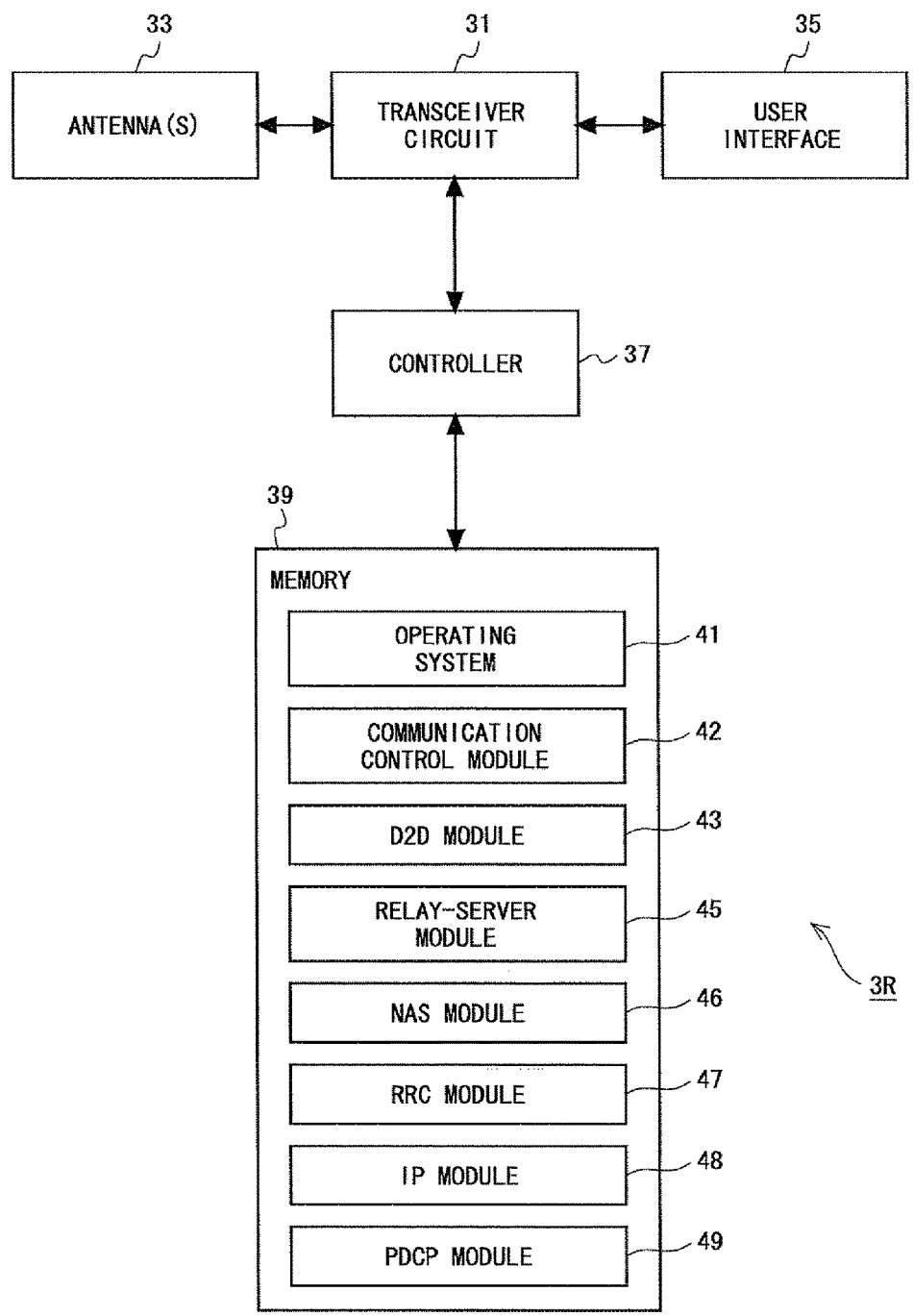
FIG. 6 is a functional block diagram illustrating some of the functionality of a relaying user communication device (UE-R) forming part of the system shown in FIG. 1.

FIG. 6 is a functional block diagram illustrating some of the functionality of a user communication device (e.g. the UE-R 3R shown in FIG. 1) when it is configured for relaying data for other user equipment. In FIGS. 5 and 6, like-numbered modules carry out the same functionality, where appropriate.

As shown, the relaying user communication device 3R has a transceiver circuit 31 that is operable to transmit signals to and to receive signals from a base station 5R and/or other user communication devices 3 via one or more antenna 33. The relaying user communication device 3R has a controller 37 to control the operation of the relaying user communication device 3R. The controller 37 is associated with a memory 39 and is coupled to the transceiver circuit 31. Although not necessarily shown in FIG. 6, the relaying user communication device 3R will of course have all the usual functionality of a conventional user communication device 3 (such as a user interface 35) and this may be provided by any one or any combination of hardware, software and firmware, as appropriate. Software may be pre-installed in the memory 39 and/or may be downloaded via the communication network or from a removable data storage device (RMD), for example.

The controller 37 is configured to control overall operation of the relaying user communication device 3R by, in this example, program instructions or software instructions stored within the memory 39. As shown, these software instructions include, among other things, an operating system 41 a communication control module 42, a device-to-device (D2D) module 43, a relay-server module 45, a NAS module 46, an RRC module 47, an IP module 48, and a PDCP module 49. Optionally, the relaying user communication device 3R may include additional modules, e.g. the relay-client module 44, if appropriate.

The communication control module 42 handles (e.g. generates, sends and receives) control signals for controlling the connections between the relaying user communication device 3R and other user communication devices 3, the base station 5, or the core network entities. The communication control module 42 also controls the separate flows of uplink/downlink data and signalling that are to be transmitted from/to the other user communication devices 3, to/from the base station 5, and the core network entities.

The device-to-device module 43 is operable to assist the communication control module 42 in setting up a device-to-device communication path (e.g. a ProSe based) to other compatible user equipment in the vicinity of the user communication device 3R (e.g. following an appropriate discovery procedure). The device-to-device module 43 may have both L1 and L2 functionality and communicates (e.g. user-plane data and control-plane data) with corresponding device-to-device modules of other communication devices using appropriately formatted D2D (e.g. ProSe) PDUs.

The relay-server module 45 communicates (using the services of the device-to-device module 43) with the relay-client module 44 of connected (relayed) user communication devices and the ReNB-server module(s) 65 of the ReNB(s) 5 serving such connected user communication devices. The relay-server module 45 facilitates communication between the relay-client module 44 and the ReNB-server module 65 by controlling the relaying between a D2D bearer (established with a particular connected user communication device) and the associated link(s) 25 established with the ReNB 5 serving that particular connected user communication device.

The NAS module 46, the RRC module 47, the IP module 48, and the PDCP module 49 of the UE-R 3R essentially correspond to the respective like-numbered modules described with reference to FIG. 5, thus their description is not repeated here.

Remote Base Station

Figure 7:
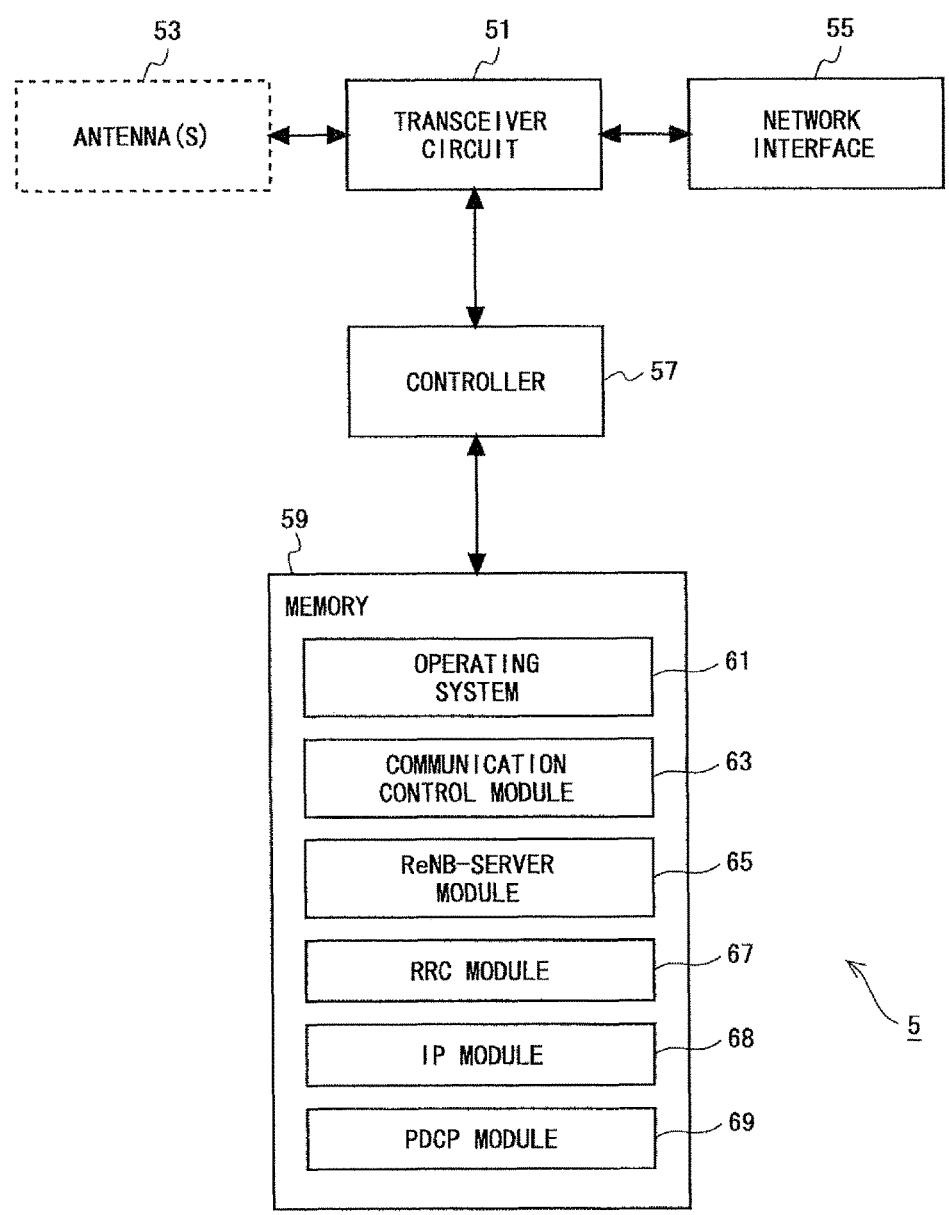
FIG. 7 is a functional block diagram illustrating some of the functionality of a remote base station forming part of the system shown in FIG. 1.

FIG. 7 is a functional block diagram illustrating some of the functionality of a remote base station 5 forming part of the system 1 shown in FIG. 1. As shown, the remote base station 5 has a transceiver circuit 51 that is operable to transmit signals to and to receive signals from user communication devices 3 via one or more antenna 53 (optional) and/or a network interface 55 and to transmit signals to and to receive signals from network nodes via the network interface 55. The remote base station 5 has a controller 57 to control the operation of the remote base station 5. The controller 57 is associated with a memory 59 and is coupled to the transceiver circuit 51.

The controller 57 is configured to control overall operation of the remote base station 5 by, in this example, program instructions or software instructions stored within the memory 59. Software may be pre-installed in the memory 59 and/or may be downloaded via the communication network or from a removable data storage device (RMD), for example. As shown, these software instructions include, among other things, an operating system 61, a communication control module 63, a ReNB-server module 65, an RRC module 67, an IP module 68, and a PDCP module 69.

The communication control module 63 handles (e.g. generates, sends and receives) control signals for controlling the connections between the remote base station 5 and the communication devices 3, the base station 5R, or the core network entities. The communication control module 63 also controls the separate flows of uplink/downlink data and signalling that are to be transmitted from/to the user communication devices 3, and the other network entities.

The ReNB-server module 65 controls communications (together with the relay-server module 45 of the UE-R 3R and the relay-client module 44 of the relayed user communication device 3) over the Layer 2 link(s) 28 between the relayed user communication device 3 and the ReNB 5.

The RRC module 67 handles (e.g. generates, sends and receives) Radio Resource Control signalling messages. In particular, the RRC module 67 communicates with, amongst others, the corresponding RRC module 47 of relayed user communication devices 3 served by the ReNB 5. The RRC module 67 is operable to extract, from messages received over the Layer 2 link, and process RRC messages. If the extracted RRC message includes an NAS message, the RRC module 47 is operable to forward the extracted NAS message to the MME 11 (e.g. using an S1-AP interface provided between the ReNB 5 and the MME 11). In the other direction, the RRC module 67 receives (NAS) messages from the MME 11 (through the S1-AP) and forwards them to the UE-R 3R to be relayed to and processed by the UE 3 (e.g. over the underlying transport layer and, optionally, via the PDCP module 69, if PDCP is used).

The IP module 68 handles (e.g. generates, sends and receives) data packets conforming to the Internet Protocol standards (e.g. IPv4, IPv6, Mobile IP, etc.). In particular, the IP module 68 communicates with, amongst others, user communication devices 3, the P-GW 14 serving a particular user communication device 3, and/or with the IP PDN 15 (via the P-GW 14). The IP module 68 may also be responsible for communicating with the P-GW 14R and/or other entities from the UE-R's 3R network 10R (through the P-GW 14R if necessary). Although not shown in FIG. 7, the IP module 68 may include a user-plane sub-module (for user data) and/or a control-plane sub-module (for control data), where appropriate. The IP module 68 may also include one or more sub-modules for realising an appropriate IP transport protocol such as TCP, SCTP, UDP, RTP and/or the like.

The (optional) PDCP module 69 performs various services associated with the PDCP layer, in particular, services related to mobility and/or security of user communication devices 3. The services performed by the PDCP module 69 include, amongst others: ciphering/deciphering, header compression and decompression, in-sequence packet delivery, duplicate detection, and/or packet retransmission services. Although not shown in FIG. 5, the PDCP module 69 may include a user-plane sub-module (for user-plane PDCP functions) and/or a control-plane sub-module (for control plane PDCP functions), where appropriate.

Once an appropriate Layer 2 link 28 has been established with the relayed user communication device 3 (via the UE-R 3R), the PDCP module 69 (or an appropriate transport layer function, e.g. if PDCP is not used) can receive messages over the Layer 2 link 28 (e.g. from the PDCP module 49/transport layer function of the relayed user communication device 3), and forward the received messages, in dependence on the contents of the received messages, to the RRC module 67 (in case of control-plane messages), and/or to the appropriate P-GW 14 (in case of user-plane messages). In the other direction, the PDCP module 69 is operable to receive user-plane data from the P-GW 14 (e.g. user-plane data coming possibly from IP PDN 15) and/or to receive control-plane data (e.g. a NAS message) from the MME 11. The PDCP module 69 is operable to forward the received message/data using the appropriate Layer 2 link 28 established with the corresponding relayed user communication device 3 (e.g. to the PDCP module 49/transport layer function thereof).

In the above description, the user communication devices 3 and 3R, and the ReNB 5 are described for ease of understanding as having a number of discrete modules (such as the communications control modules, the relay-server/relay-client modules, and the NAS/RRC/IP/PDCP modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation—Relaying RRC Signalling

Figure 8:
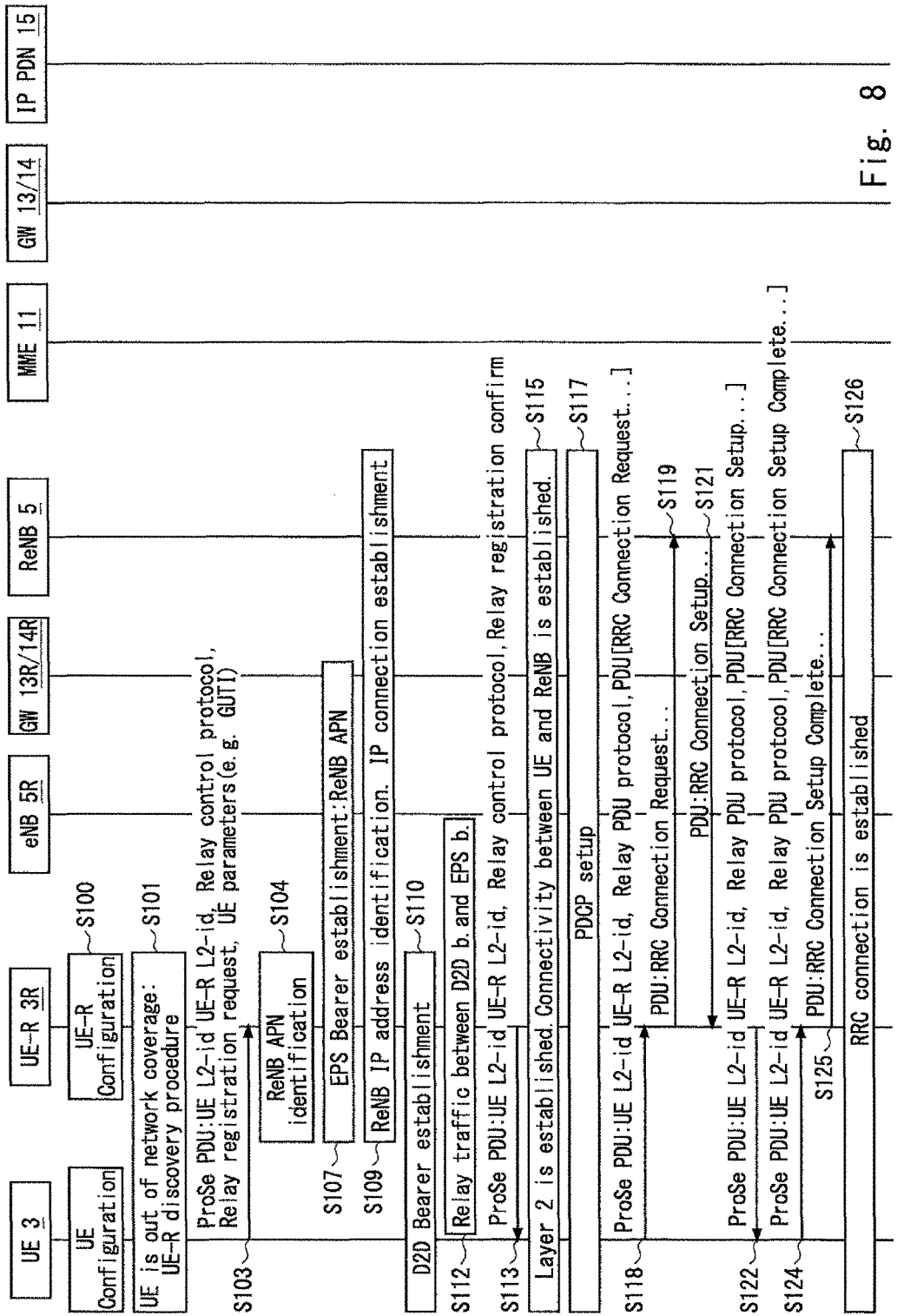
FIG. 8 is a timing diagram illustrating an exemplary way in which establishment of an RRC connection for a relayed user communication device may be realised in the system shown in FIG. 1.

FIG. 8 is a timing diagram illustrating an exemplary way in which establishment of an RRC connection for a relayed user communication device 3 may be realised in the system shown in FIG. 1.

Initially, as generally shown at step S100, the user communication device 3 is configured (e.g. using its D2D module 43) for being relayed (e.g. because it is determined that the user communication device 3 is currently out of network coverage). The other user communication device 3R is set up to operate as a UE-Relay (although there may not be any user equipment connected to it yet) at least whilst the UE-R 3R is within the coverage of the network (base station 5R).

In step S101, the user communication devices 3 and 3R perform a relay discovery procedure (using their respective D2D modules 43). The procedure at step S101 is optional and can be initiated by either user communication device by sending an appropriate D2D beacon, and the relay discovery procedure may comprise exchanging one or more signalling messages between the user communication devices 3 and 3R (and possibly involving the base station 5R and/or a core network entity, e.g. the MME 11R).

After the discovery procedure has been completed, and the user communication device 3 has identified the UE-R 3R, the user communication device 3 (using its relay-client module 44) and the UE-R 3R (using its relay-server module 45) identify/select a suitable ReNB 5 for the user communication device 3, and proceed to establish a Layer 2 link between the relayed user communication device 3 and the ReNB 5.

In particular, the following steps are performed by the various entities.

First, in step S103, the user communication device 3 (using its relay-client module 44 and D2D module 43) initiates registration with the UE-R 3R (i.e. with the relay-server 45 module thereof) for using UE-Relay services. Specifically, the user communication device 3 generates (using its D2D module 43) and sends an appropriately formatted signalling message (which may comprise e.g. a ProSe PDU) to the UE-R 3R.

The user communication device 3 includes in this message:

i) information identifying the type of message (e.g. Relay control protocol message);

ii) the relay registration request (provided by the relay-client module 44);

iii) information identifying the sender, i.e. the relayed user communication device 3 (e.g. an associated Layer 2 identifier and/or the like);

iv) information identifying the recipient, i.e. the UE-R 3R (e.g. an associated Layer 2 identifier and/or the like); and v) any UE parameters that may be needed to comply with this request, e.g. a Globally Unique Temporary Identifier (GUTI) associated with the relayed user communication device 3 and/or the ReNB 5.

Upon receipt of this message at the UE-R 3R, based on the type of message (which in this case is a Relay control protocol message), the contents of the message are passed to the relay-server module 45 for processing.

In step S104, the UE-R 3R (using its relay-server module 45), possibly with support by the network, identifies the ReNB 5 designated/selected for serving the relayed user communication device 3 (e.g. based on the Relay registration request and/or the GUTI, if provided). Specifically, in this example, the UE-R 3R obtains an Access Point Name (APN) associated with the ReNB 5.

Next, in step S107, the UE-R 3R (using its relay-server module 45) initiates establishment of an EPS bearer for the APN associated with the ReNB 5. Effectively, this EPS bearer serves as a default EPS bearer for the relayed user communication device 3. In step S109, the UE-R 3R (the relay-server module 45) also initiates the establishment of an IP connection between the UE-R 3R and the ReNB 5 for the purpose of relaying data for the user communication device 3. In step S109, the UE-R 3R also performs any procedures appropriate for the newly established IP connection, e.g. identification of the IP address associated with the ReNB 5 and/or security procedures. The IP connection is established, in this example, between an IP address associated with the ReNB's 5 APN on one end, and an IP address associated with the UE-R 3R (e.g. its EPS bearer) on the other end.

In step S110, the user communication device 3 and the UE-R 3R (using their respective D2D modules 43) initiate the establishment of a D2D bearer 29 between the relayed user communication device 3 and the UE-R 3R.

At this point, as generally shown in step S112, the UE-R 3R is configured for relaying traffic between the user communication device 3 (i.e. the D2D interface) and the ReNB 5 (i.e. the UE-R's 3R IP connection 26 towards the ReNB 5). In particular, the UE-R 3R creates a mapping between the relayed user communication device 3 and the ReNB 5, e.g. by keeping an appropriate association between the Layer 2 identifier for the relayed user communication device 3 and the corresponding transport connection 25 established towards the ReNB 5.

In step S113, the UE-R 3R generates (using its D2D module 43) and sends an appropriately formatted signalling message (which may comprise e.g. a ProSe PDU), and includes in this message a confirmation that the relay registration (requested in step S103) has been successfully completed. The UE-R 3R also includes in this message information identifying the type of message (so that it can be passed to the relay-client module 44 upon receipt), and information identifying the relayed user communication device 3 and the UE-R 3R (e.g. their associated Layer 2 identifiers), i.e. the recipient and the sender, respectively.

As shown generally at step S115, a Layer 2 link 28 (and hence connectivity) is now established between the relayed user communication device 3 and the serving ReNB 5.

It will be appreciated that multiple Layer 2 links 28 can be established between the relayed user communication device 3 and the ReNB 5 e.g. by repeating steps S103 to S115. However, multiple Layer 2 links 28 may also be established at once, e.g. by including multiple requests in the ProSe PDU sent in step S103 and processing/confirming the multiple requests substantially together (in steps S104 to S113). For example, separate Layer 2 links 28 may be used for relaying control-plane and user-plane PDUs, respectively, e.g. in accordance with any of FIGS. 10 to 16. If multiple Layer 2 links 28 are used, each Layer 2 link 28 may beneficially have its own associated Quality of Service (QoS), e.g. adapted to the transported PDUs over that particular Layer 2 link 28.

In step S117, using the appropriate Layer 2 link 28 established between them, the relayed user communication device 3 and the ReNB 5 proceed to setup an appropriate PDCP connection 24 with each other (e.g. by configuring their respective PDCP modules 49 and 69, as required). The PDCP connection 24 allows the two endpoints (i.e. the relayed user communication device 3 and the ReNB 5) to communicate securely and effectively (e.g. by applying appropriate PDCP services, such as ciphering, header compression, in-sequence packet delivery, duplicate detection, packet retransmission, and/or the like).

Next, as illustrated in steps S118 to S126, the relayed user communication device 3 and the ReNB 5 proceed to establishing an RRC connection 23 using the PDCP connection 24 and the Layer 2 link 28 established between them.

The relayed user communication device 3 initiates RRC connection 23 establishment by generating (using its D2D module 43) and sending, at step S118, an appropriately formatted signalling message (which may comprise e.g. a ProSe PDU) to the UE-R 3R. The D2D module 43 also includes in this message an appropriately formatted RRC Connection Request message (provided by the RRC module 47). In this example, the RRC message is included in an appropriately formatted PDU (comprised within the ProSe PDU) addressed to the ReNB 5. The message also includes information identifying the sender and the recipient (e.g. their respective Layer 2 identifiers) and information identifying the type of message (i.e. 'Relay PDU Protocol' message to be processed by the relay-server module 45 of the UE-R 3R).

The UE-R 3R (using its D2D module 43) receives ProSe message over the D2D bearer 29 and (using its relay-server module 45 and the 'Relay PDU protocol' message) forwards, in step S119, the PDU comprising the PDCP message comprising the RRC message to the ReNB 5 (that corresponds to the sender of the preceding message based on the earlier registration). The forwarded PDU is received by the PDCP module 69 (realised in some alternatives over the IP module 68) of the ReNB 5 and passed on to the RRC module 67 for processing.

In step S121, the ReNB 5 generates and sends an appropriately formatted signalling message to the UE-R 3R (e.g. using a PDU comprising a PDCP PDU), and includes in the message a response to the RRC Connection Request received in the preceding step. In this example, the response comprises an RRC message provided by the RRC module 67, e.g. an 'RRC Connection Setup' message, for the relayed user communication device 3.

In response to this message, the UE-R 3R generates (using its D2D module 43) and sends, in step S122, a signalling message including a ProSe PDU. The UE-R 3R includes in this PDU the ReNB's 5 RRC Connection Setup message received in the preceding step. The UE-R 3R includes in this PDU information identifying the sender and the receiver (e.g. by their appropriate Layer 2 identifiers) and the type of message (in this case, Relay PDU protocol communication) so that the contents of this message are passed to the relay-client module 44 responsible for handling that type of messages.

The relayed user communication device 3 configures its RRC module 47 in accordance with the received RRC Connection Setup message, and generates (using its D2D module 43) and sends, at step S124, an appropriately formatted signalling message (which may comprise e.g. a ProSe PDU) to the UE-R 3R. The D2D module 43 also includes in this message an appropriately formatted confirmation message, e.g. an 'RRC Connection Setup Complete' message (provided by the RRC module 47). The signalling message (ProSe PDU) may comprise a message (PDU) obtained by the D2D module 43 from a higher layer and/or a message (PDU) generated by the D2D module 43 itself. In case the D2D module 43 obtains a message (PDU) from a higher layer, such as from the NAS layer (NAS module 46), the RRC layer (RRC module 47), the IP layer (IP module 48), and/or the PDCP layer (PDCP module 49), the D2D module 43 may be configured to adapt/modify the message (PDU) obtained from the higher layer, where appropriate, before forwarding the higher-layer message (PDU).

In this example, the RRC confirmation message (obtained from the RRC module 47) is included in an appropriately formatted PDU (comprised within the ProSe PDU) addressed to the ReNB 5. The message also includes information identifying the sender and the recipient (e.g. their respective Layer 2 identifiers) and information identifying the type of message (i.e. 'Relay PDU Protocol' message to be processed by the relay-server module 45 of the UE-R 3R).

The UE-R 3R (using its D2D module 43) receives the ProSe message over the D2D bearer 29 and (using its relay-server module 45) forwards, in step S125, the PDU comprising the RRC confirmation message to the ReNB 5 (that corresponds to the sender of the preceding message based on the earlier registration). The forwarded PDU is received by the PDCP module 69 of the ReNB 5 and passed on to the RRC module 67.

At this point, as generally illustrated in step S126, an RRC connection 23 has been successfully established (using the Layer 2 link) between the relayed user communication device 3 and the ReNB 5. This RRC connection 23 allows the exchange of radio level information, and can support communication in accordance with the RRC protocol as described in 3GPP TS 36.300 and TS.36.331. Accordingly, when the RRC module 47 (of the relayed user communication device 3) is in the so-called 'RRC_connected_mode', the ReNB 5 is able to provide similar (or the same) Access-Stratum (AS) services to the relayed user communication device 3 as provided by a conventional eNB to non-relayed user equipment.

Thus, for the relayed user communication device 3, various RRC services may be realised in the 'RRC_connected_mode', including security and mobility functions in particular. RRC security functions are made possible by the establishment of a data bearer and an associated PDCP connection 24 between the relayed user communication device 3 and the ReNB 5 (transparently, via the UE-R 3R). RRC mobility functions may include, for example, UE measurement functions (such as signal quality and/or interference measurements), and the transfer of NAS messages by the ReNB 5 (e.g. to/from the MME 11).

The NAS protocol of the user communication device 3 is not impacted (or it can be reused with minimum impact) because the NAS protocol is realised according to the existing standards. Therefore, the ReNB 5 assures the transfer of any NAS message to the MME 11 with minimum impact on the S1-AP interface and RRC transfer functions.

The NAS protocol and its procedures are described in the 3GPP TS 23.401 standards specification, including procedures performed in the so-called 'ECM-CONNECTED' mode of operation, i.e. when a particular item of user equipment has an EPS Connection Management (ECM) connection with its serving MME for communicating NAS messages. The relayed user communication device 3 is able to perform, for example, an attach procedure, a tracking area update (TAU) procedure with its MME 11, and/or a default bearer establishment procedure (which is shown in FIG. 8). It shall be noted that the MME 11 might consider the relayed user communication device 3 to be within a specific tracking area (i.e. a different tracking area than the base station 5/UE-R 3R belong to) as the relayed user communication device 3 is not connected to its core network 9 directly, but through the UE-R 3R.

In particular, in the context of the system illustrated in FIG. 1 and further described with reference to FIG. 9, a dedicated EPS bearer can be established between the UE-R 3R and the P-GW 14R (and a corresponding IP connection established between the UE-R 3R and the ReNB 5), which makes it possible for the relayed user communication device 3 to operate in the 'ECM-CONNECTED' mode and to communicate NAS messages with the MME 11 (over the Layer 2 link provided via the UE-R 3R and the ReNB 5).

Operation—Relaying NAS/User-Plane Signalling

Figure 9:
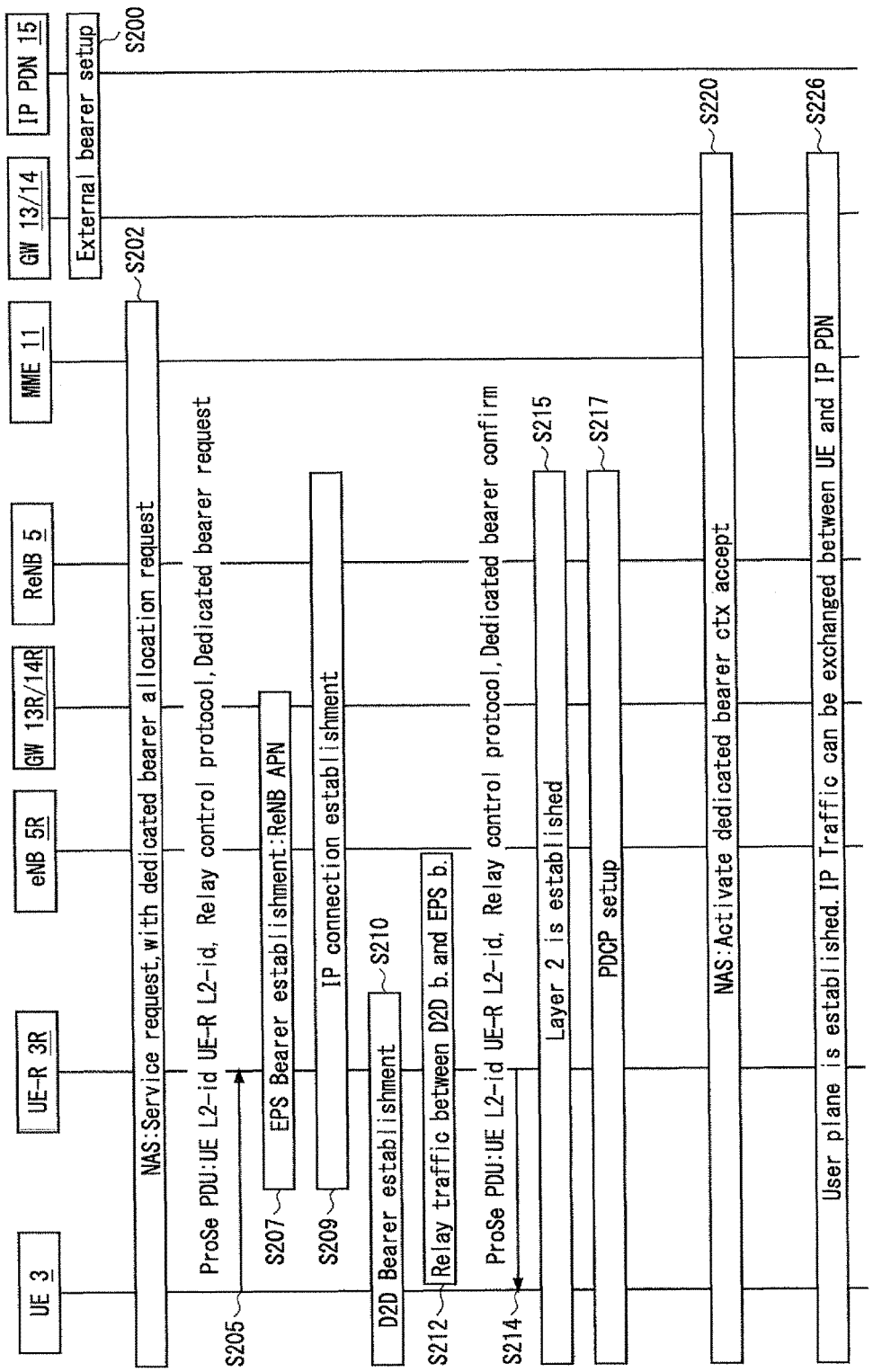
FIG. 9 is a timing diagram illustrating an exemplary way in which establishment of an EPS bearer for a relayed user communication device may be realised in the system shown in FIG. 1.

FIG. 9 is a timing diagram illustrating an exemplary way in which establishment of a dedicated EPS bearer for a relayed user communication device 3 may be realised in the system shown in FIG. 1. In this example, the establishment of the dedicated EPS bearer is for the purpose of communicating user-plane data between the relayed user communication device 3 and a communication node in the IP PDN 15. The procedure shown in FIG. 9 might be performed as part of (e.g. continuation of) the procedure described above with reference to FIG. 8 or it might be performed as a separate procedure.

In this example, as generally shown at step S200, an external bearer 21 is provided between the IP PDN 15 and the P-GW 14 serving the relayed user communication device 3 (although it is noted that this step may be performed as part of a subsequent step, e.g. S220). It is also assumed that the relayed user communication device 3 has established a NAS connection 22 with the MME 11, supported by the Layer 2 link 28 with its serving ReNB 5, having followed the procedures described with reference to FIG. 8. Accordingly, the relayed user communication device 3 is able to exchange control-plane (e.g. RRC/NAS) signalling messages with the ReNB 5 and the MME 11 (via the ReNB 5).

In step S202, the relayed user communication device 3 requests the MME 11 to allocate a dedicated bearer, e.g. using the control-plane connection (over the Layer 2 link 28) established with the ReNB 5. It does so by generating (using its NAS module 46) and sending (using its control-plane connection) an appropriately formatted NAS service request (e.g. a 'Dedicated bearer request' message) to the MME 11. Although not shown in FIG. 9, the MME 11 proceeds to set up the gateways 13/14 for handling traffic associated with the requested dedicated bearer and sends an appropriate confirmation to the relayed user communication device 3, when the configuration of the gateways 13/14 has been completed.

Next, the relayed user communication device 3 proceeds to initiating the creation of a dedicated Layer 2 link (as opposed to the 'default' Layer 2 link established in step S115 of FIG. 8) corresponding to the dedicated EPS bearer requested in step S202. In order to do so, the relayed user communication device 3 generates (using its D2D module 43) and sends, in step S205, an appropriately formatted message, in a ProSe PDU, to the UE-R 3R. The relayed user communication device 3 includes in this message an indication of the type of bearer requested, e.g. a request for a dedicated bearer to the ReNB 5 for relaying user-plane data via the UE-R 3R. Specifically, the PDU includes information identifying the relayed user communication device 3 (e.g. an associated Layer 2 identifier), information identifying the UE-R 3R (e.g. an associated Layer 2 identifier), and a request for establishment of the dedicated bearer. The PDU sent at S205 is processed by the relay-server module 45 of the UE-R 3R, which then proceeds to step S207. Whilst step S205 is similar to S103 (both initiates the establishment of an IP connection with the ReNB 5), at this phase, APN identification for the ReNB 5 (as described above with reference to step S104) may not be necessary, since the UE-R 3R might have previously registered the relayed user communication device 3, thus it might have already performed step S104.

In step S207, the UE-R 3R (e.g. using its relay-server module 45) initiates establishment of the requested (dedicated) EPS bearer to an APN associated with the ReNB 5 (e.g. in addition to any existing or 'default' EPS bearer it already has with the ReNB 5). Next, in step S209, the UE-R 3R (e.g. using its relay-server module 45) also initiates the establishment of an IP connection 26 between the UE-R 3R and the ReNB 5 for the purpose of relaying data (in this case, user-plane data) for the user communication device 3. At this phase, IP address identification for the ReNB 5 (as described above with reference to step S109) may not be necessary, since the UE-R 3R might have already registered the relayed user communication device 3, thus it might have already performed step S109.

In step S210, the relayed user communication device 3 and the UE-R 3R (using their respective D2D modules 43) initiate the establishment of a D2D bearer 29 between the relayed user communication device 3 and the UE-R 3R. Alternatively, the user communication device 3 and the UE-R 3R may perform a reconfiguration of an existing D2D bearer 29 between them (e.g. the reconfiguration of a 'default' D2D bearer established in step S110), instead of establishing a new D2D bearer 29.

At this point, as generally shown in step S212, the UE-R 3R is configured for relaying traffic between the user communication device 3 and the ReNB 5 (i.e. traffic communicated over the requested dedicated bearer).

Thus, in step S214, the UE-R 3R generates (using its D2D module 43) and sends an appropriately formatted message, e.g. in a ProSe PDU, and includes in this message a confirmation that the requested dedicated bearer has been successfully set up. The UE-R 3R also includes in this message information identifying the relayed user communication device 3 and the UE-R 3R (e.g. their associated Layer 2 identifiers), and the type of message (e.g. 'Relay control protocol' message) so that it can be passed to the appropriate relay-client module 44. The confirmation is processed by the client-server module 44 of the relayed user communication device 3, which determines, at step S215, that a Layer 2 link 28 is now established between the relayed user communication device 3 and the serving ReNB 5 for the requested dedicated bearer.

In step S217, using the appropriate Layer 2 link 28 established between them, the relayed user communication device 3 and the ReNB 5 proceed to setup an appropriate PDCP connection with each other (e.g. by an appropriate configuration of their respective PDCP modules 49 and 69).

Next, in step S220, the relayed user communication device 3 (using its NAS module 46) receives an appropriately formatted message, e.g. from the MME 11, informing the relayed user communication device 3 that the activation of the requested dedicated bearer is complete. For example, the MME 11 may send an 'Activate dedicated bearer ctx accept' NAS message to the relayed user communication device 3 (i.e. the NAS module 46 thereof) via the ReNB 5 and over the Layer 2 link 28 provided between the ReNB 5 and the relayed user communication device 3. In this case, the MME's 11 NAS message is sent, using an appropriately formatted S1-AP message, to the ReNB's 5 RRC module 67. The ReNB 5 (using its RRC module 67) transfers the message to the PDCP module 69 and sends the message towards the relayed user communication device 3 (the PDCP module 49 thereof) using an appropriate Layer 2 link 28 protocol.

Finally, as generally shown in step S226, a user-plane connection is now established between the relayed user communication device 3 and the IP PDN 15 (e.g. an application in the IP PDN 15). Thus, using the requested dedicated bearer (which is relayed, transparently, by the UE-R 3R using the Layer 2 link 28 established at S215) and the external bearer (set up at S200), the relayed user communication device 3 is able to communicate user-plane data with a communication endpoint in the IP PDN 15.

Thus, in summary, using the above described relay architecture and procedures, it is possible to provide a level of services for user equipment (relayed using a UE-R) meeting at least the following 3GPP requirements:

- UE-R functionalities can be provided by a standard item of user equipment (i.e. without requiring the provision of eNB functionalities within the UE-R);
- UE-R impacts with respect to the relay feature are limited, compared to other solutions, since the UE-R only needs to implement the functionalities of the relay-server module 45;
- user equipment connected to the UE-R remain fully controlled by the 3GPP network (e.g. EPC+E-UTRAN entities such as MME and/or base station), and can access 3GPP network services; and
- user equipment served (relayed) by the UE-R can benefit from the same level of security as offered by the current 3GPP specifications for non-relayed user equipment (e.g. the provision of a PDCP layer connection between the relayed UE and its serving ReNB and/or standard AS/NAS security procedures).
- Beneficially, it is possible to use a Release 8 compliant base station to the UE-R's serving base station, thus backward compatibility is maintained.

Further, the UE-R can be connected to any type of network infrastructure (including UMTS, Wi-Fi, and/or the like).

Advantageously, the relayed UE (using an associated relay-client module 44) and the UE-R (using an associated relay-server module 45) determine the IP address for communicating with the ReNB (e.g. based on an APN name) and establish a Layer 2 link (or links) between the relayed UE and the ReNB.

Protocol Stacks

FIGS. 10 to 13 illustrate various exemplary protocol stacks (for the relayed UE, the UE-R, the ReNB, and the other network nodes) that may be used to put the above described procedures into use.

Figure 10:
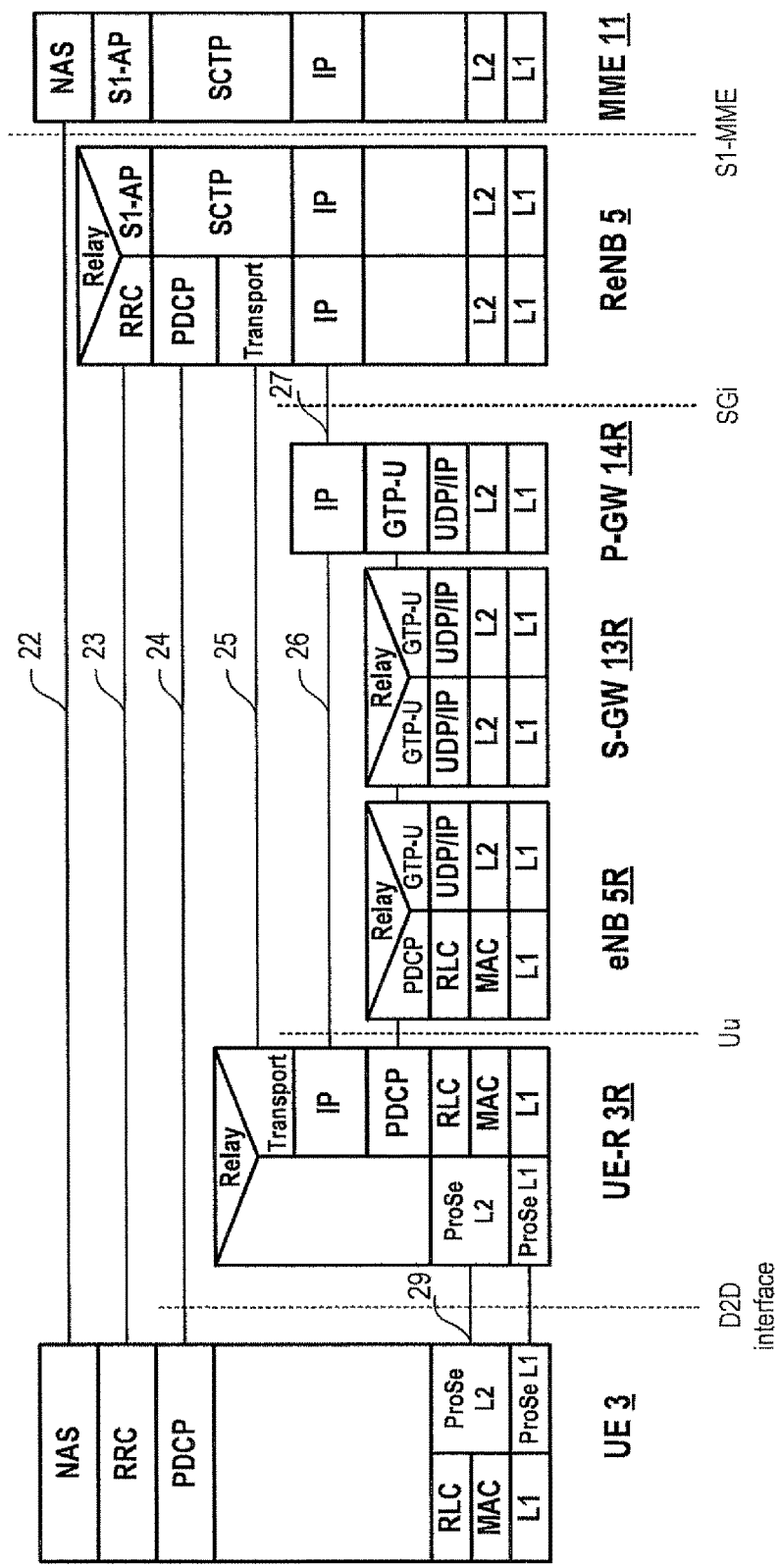
FIG. 10 illustrates schematically exemplary control-plane protocol stacks of the elements shown in FIG. 1.

FIG. 10 illustrates schematically the exemplary control-plane protocol stacks of the elements shown in in FIG. 1 involved in the relaying of control-plane signalling between the relayed user communication device 3 and its serving network 10. In this case, relaying of control-plane (e.g. NAS/RRC) signalling is realised at the Transport layer between the ReNB 5 and the UE-R 3R (e.g. over link 25 provided between the respective IP addresses associated with the UE-R 3R and the ReNB 5). Further, the relaying layers between the UE-R 3R and the UE 3 are realised by using appropriate device-to-device Layer 2 and Layer 1 communication technologies (denoted 'ProSe L2' and 'ProSe L1' in FIG. 10). In this example, the Layer 2 and Layer 1 communication technologies are based on standard LTE radio technologies.

The relayed user communication device 3 is therefore able to communicate RRC signalling (to/from the ReNB 5) and/or NAS signalling (to/from the MME 11) and it can thus be perceived as connected to the network (e.g. upon completion of appropriate RRC/NAS procedures).

In this case, the layer 2 (end-to-end) user-plane may be realised by: i) providing a ProSe D2D link 29 between the relayed user communication device 3 and the UE-R 3R; ii) relaying within the UE-R 3R at the Transport layer; and iii) transporting user-plane traffic in a link 25 between the UE-R 3R and the ReNB 5. This is further illustrated in FIG. 11.

Figure 11:
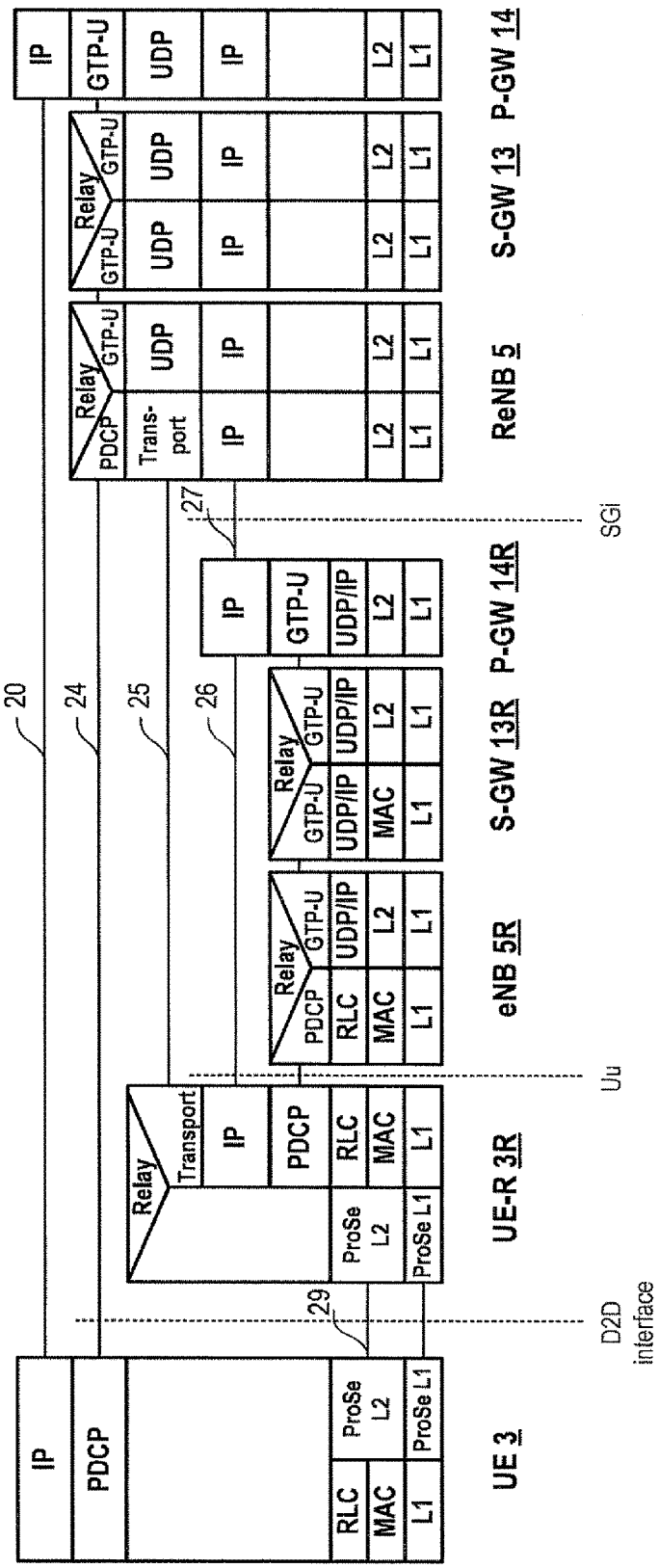
FIG. 11 illustrates schematically exemplary user-plane protocol stacks of the elements shown in FIG. 1.

FIG. 11 illustrates schematically the exemplary user-plane protocol stacks of the elements shown in FIG. 1 involved in the relaying of user-plane data between the relayed user communication device 3 and its serving network 10. FIG. 11 also shows the gateways 13/14 serving the relayed user communication device 3. As can be seen, user-plane (e.g. IP) signalling is relayed at the Transport layer of the UE-R 3R, and using appropriate device-to-device L2 and L1 communication technologies between the UE-R 3R and the relayed UE 3. When the relayed user communication device 3 communicates IP signalling (and/or the like), such signalling is relayed at the Transport layer of the UE-R 3R and communicated via the P-GW 14 to/from an endpoint beyond the P-GW 14, e.g. an application in an external network/IP PDN (not shown in FIG. 11).

Figure 12:
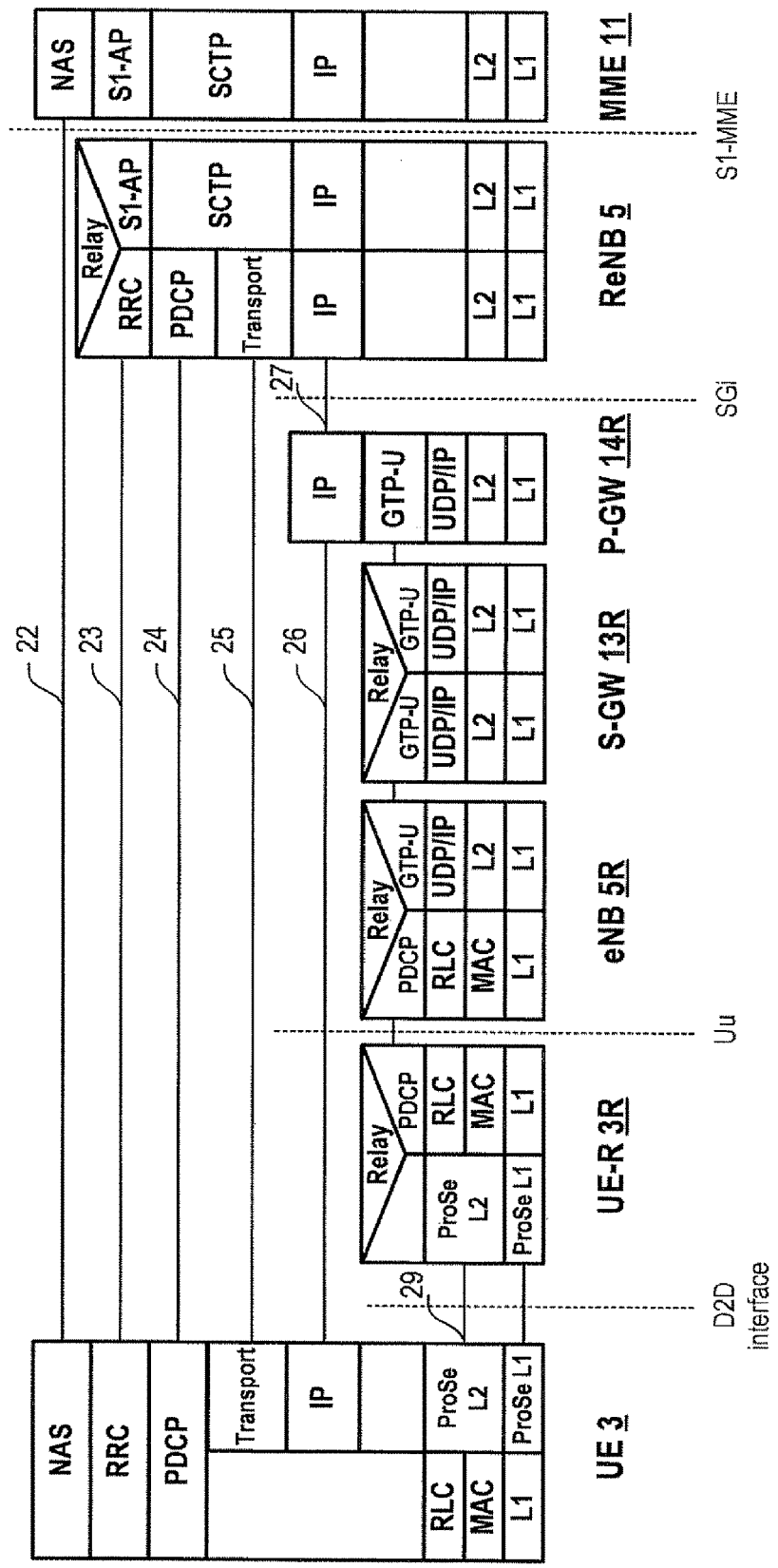
FIG. 12 illustrates schematically exemplary control-plane protocol stacks of the elements shown in in FIG. 1 when relaying is performed at the Packet Data Convergence Protocol (PDCP) level.

FIG. 12 illustrates schematically exemplary control-plane protocol stacks of the elements shown in FIG. 1 when relaying (of control-plane signalling between the relayed user communication device 3 and its serving network 10) is performed at PDCP level. In this case, the Transport and IP layer functions are provided by the relayed user communication device 3 rather than the UE-R 3R (from where they have been omitted for clarity).

Accordingly, (end-to-end) control-plane can be realised by: i) providing an appropriate D2D (e.g. ProSe) link 29 between the relayed user communication device 3 and the UE-R 3R; ii) relaying within UE-R 3R below the IP/Transport layers (since such layers are handled by the UE 3), e.g. at the PDCP layer; and iii) conveying IP packets using an appropriate transport connection 25 between the relayed user communication device 3 and the ReNB 5 (through respective GTP-U connections (and/or the like) between the base station 5 and the S-GW 13R, and between the S-GW 13R and the P-GW 14R).

Figure 13:
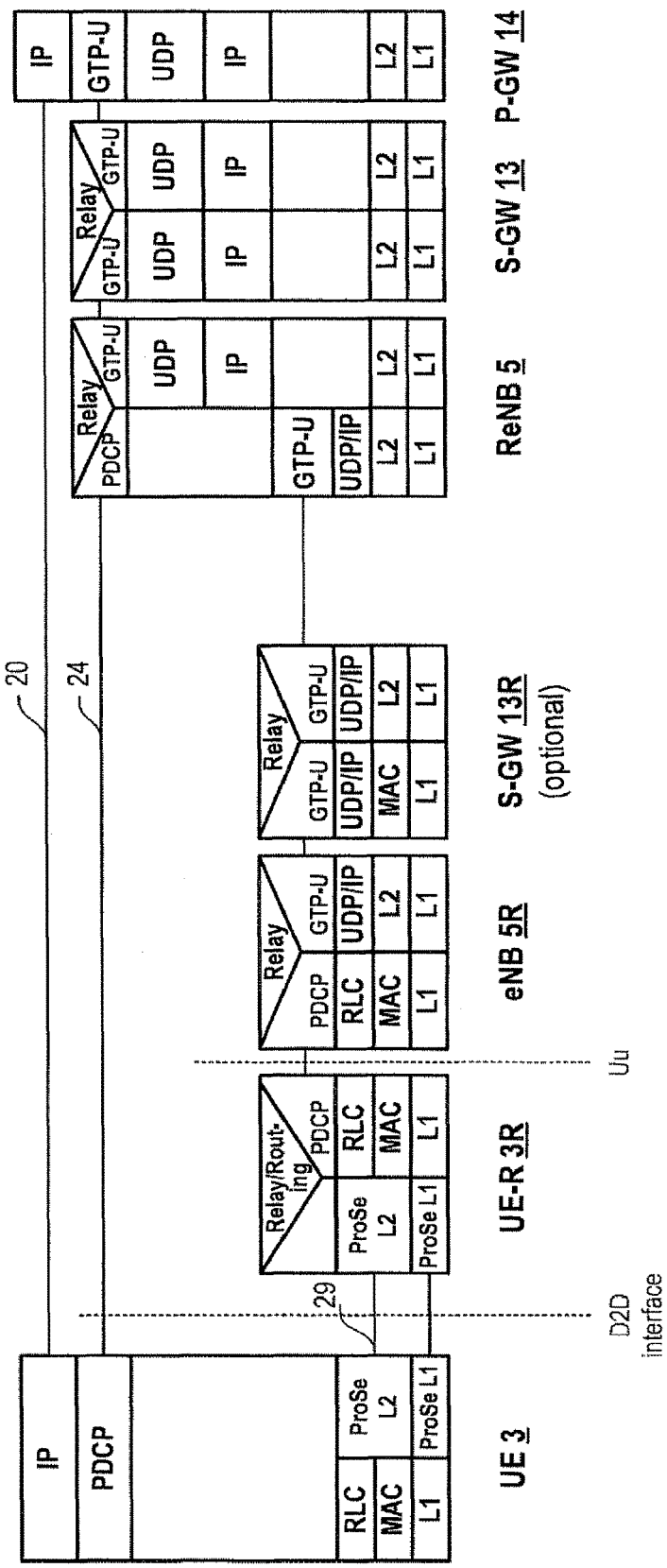
FIG. 13 illustrates schematically exemplary user-plane protocol stacks of the elements shown in in FIG. 1 when relaying is performed at PDCP level.

FIG. 13 illustrates schematically exemplary user-plane protocol stacks of the elements shown in in FIG. 1 when relaying (of user-plane data between the relayed user communication device 3 and its serving network 10) is performed at PDCP level. In this case, however, the base station 5R (serving the UE-R 3R) is connected by a GTP-U connection to the ReNB 5 (serving the relayed UE 3) via the S-GW 13R. However, it will be appreciated that the provision of an S-GW 13R is optional, i.e. the base station 5R and the ReNB 5 may be connected directly. Alternatively, the S-GW function may be integrated into the base station 5R (and/or the ReNB 5). Further, there is no P-GW 14R and hence no relaying at the IP Level in a P-GW 14R—instead the end-to-to end connection comprises an IP connection directly between the relayed user communication device 3 and the P-GW 14.

Figure 14:
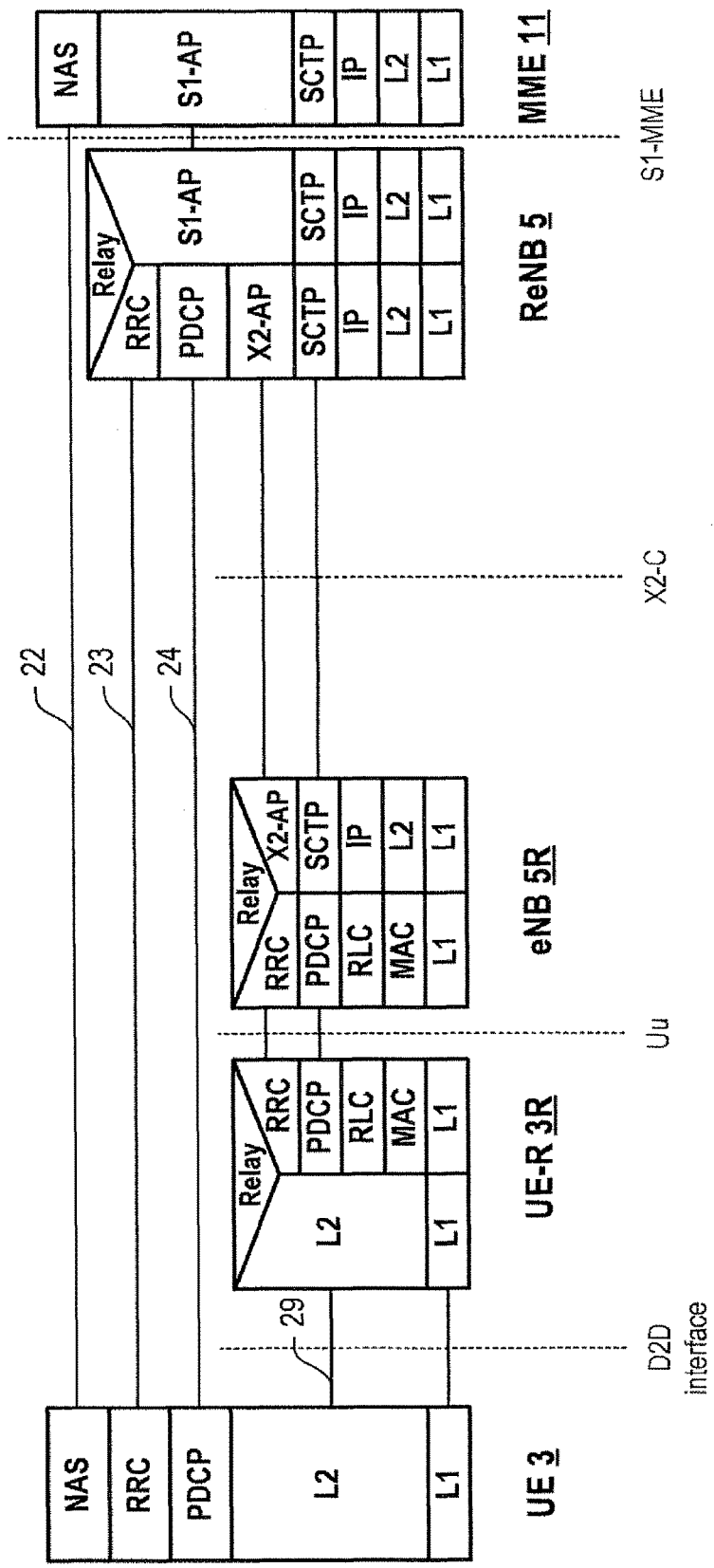
FIG. 14 illustrate schematically exemplary control-plane protocol stacks of the elements shown in FIG. 1 when relaying is performed using the X2 protocol.
Figure 15:
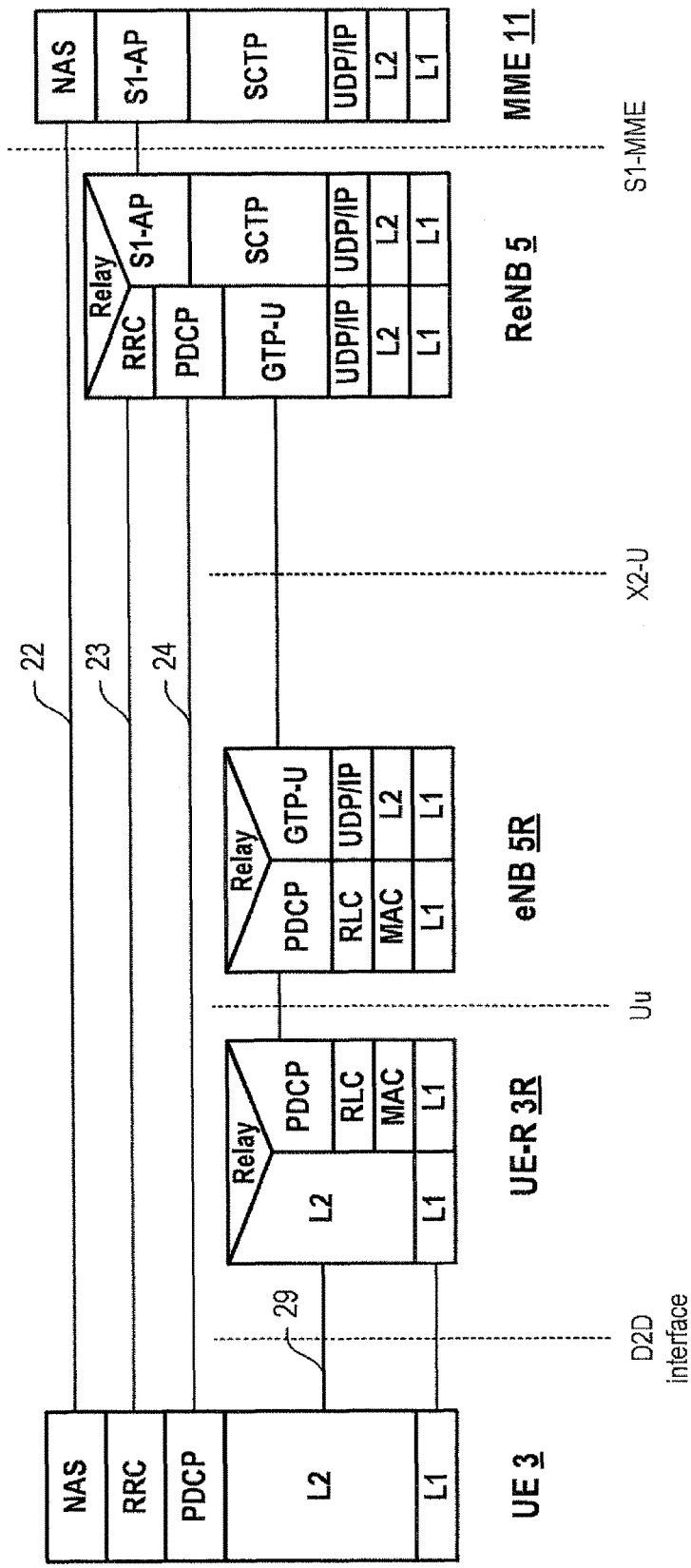
FIG. 15 illustrate schematically exemplary control-plane protocol stacks of the elements shown in FIG. 1 when relaying is performed using the X2 protocol.

FIGS. 14 and 15 illustrate schematically exemplary control-plane protocol stacks of the elements shown in FIG. 1 when relaying (of the relayed user communication device's 3 control-plane signalling) is performed using the X2 protocol. In FIG. 15, the X2-U (user-plane of X2) protocol is used between the base station 5R and the ReNB 5 to carry control-plane signalling for the relayed user communication device 3. In FIG. 14, the X2-C (control-plane of X2) protocol is used between the base station 5R and the ReNB 5 to carry control-plane signalling for the relayed user communication device 3.

Figure 16:
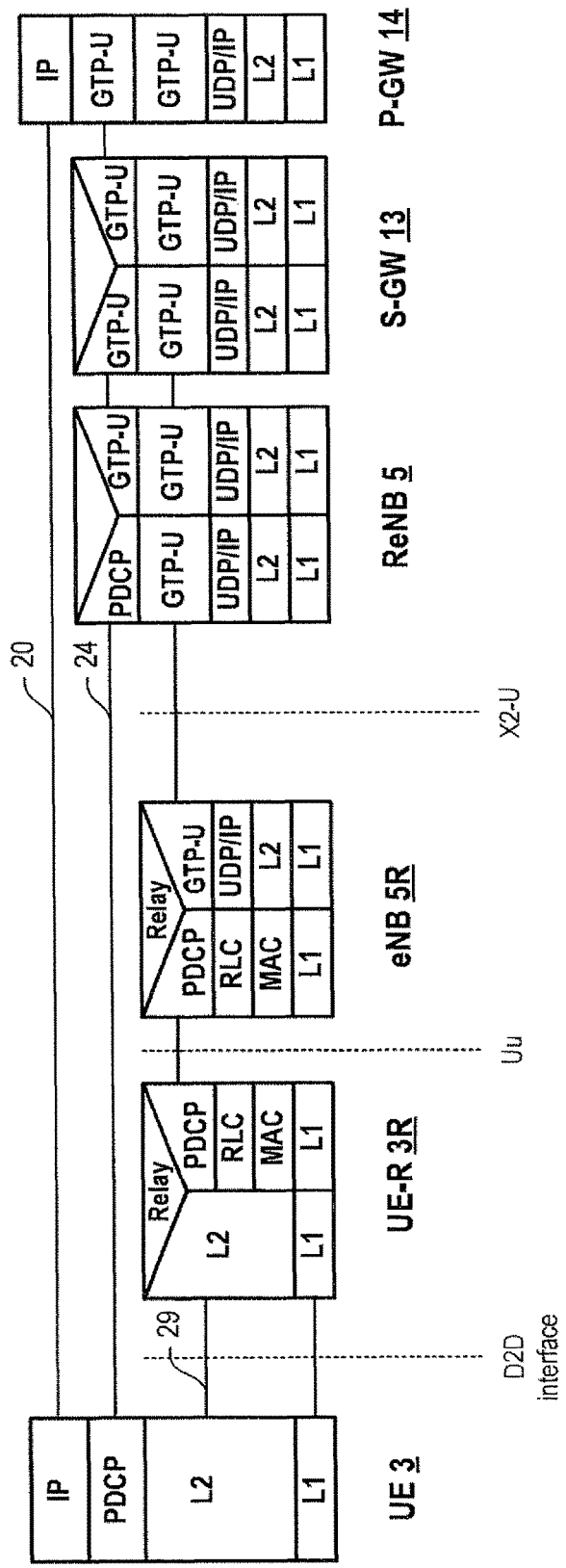
FIG. 16 illustrates schematically exemplary user-plane protocol stacks of the elements shown in FIG. 1 when relaying is performed using the X2 protocol.

FIG. 16 illustrates schematically exemplary user-plane protocol stacks of the elements shown in FIG. 1 when relaying (of the relayed user communication device's 3 user-plane data) is performed using the X2 protocol. Specifically, in FIG. 16, the X2-U protocol is used between the base station 5R and the ReNB 5 to carry user-plane data for the relayed user communication device 3.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In FIG. 1, separate networks 10 (serving the UE-R) and 10R (serving the relayed user communication device) are shown. It will be appreciated that networks 10 and 10R may belong to (operated by) different network operators or the same network operator. Similarly, the base station 5R and ReNB 5 may belong to (be operated by) different network operators or the same network operator, and the relayed UE 3 and UE-R 3R may have different network operators or the same network operator.

In FIG. 1, the IP PDN is shown to be connected to the relayed UE's network 10. However, it will be appreciated that the IP PDN may also be connected to the UE-Relay's network 10R (e.g. to P-GW 14R) as well.

As those skilled in the art will appreciate, two user communication devices 3 and 3R and two base stations 5 and 5R are shown in FIG. 1 for illustration purposes, additional user equipment and/or base stations may be present in a deployed system. It will also be appreciated that, although shown as separate networks in FIG. 1, the two user communication devices 3 and 3R may be served by the same network (although in this case it will be appreciated that each user communication device 3 and 3R may be served by different MMEs and/or gateways of the same network). Further, it will be appreciated that, whilst shown as separate entities, the functionalities of the S-GW and the P-GW could be implemented in a single gateway element.

In the above examples, the ReNB 5 is described to form part of a network associated with the relayed user communication device. It will be appreciated that the functionalities of the ReNB may be provided by any suitable core network entity and/or a RAN entity (e.g. a base station, a relay node, and/or a standalone ReNB node). For example, the additional ReNB 5 functionality may be implemented as part of a conventional eNB, with appropriate ReNB enhancements, that can therefore deal with relayed UEs that can be located somewhere else in the network (in this case the ReNB can also have same (or similar) functionalities as a conventional eNB (for example it may provide its own cell(s) and serve its own mobile devices directly (without relaying))) in addition to the functionalities for controlling and communicating with relayed UEs.

It will be appreciated that some (or all) functionalities of the ReNB may be implemented by a different network entity, for example, an entity that provides support for ProSe functionality from the network point of view. For example, ReNB functionalities may be provided by the MME and/or any other suitable core network (and/or RAN) entity.

It will be appreciated that a plurality of relayed UEs may share a common Layer 2 link ID, and may be connected and controlled using the common Layer 2 Link ID. This is likely to have benefits in terms of efficiency for situations such as Group Call Communications (application of GCSE and ProSe, when, for example, users are in relatively close proximity).

It will be appreciated that an RRC connection could be provided over a PDCP connection between the UE-R and the eNB (serving the UE-R). In this case RRC messages from a relayed user communication device will be encapsulated in the RRC messages of a UE-R when transferred to the eNB.

It will be appreciated that whilst the UE is described as sending the message that initiates provision of the end-to-end communication link between the UE and the ReNB, the link could be initiated by the UE-R sending a message to the UE.

In the above examples, relayed (D2D) communication paths are described to use an LTE technology (i.e. the same communication technology that is used between the network and the relaying user communication device). However, it will be appreciated that a D2D interface between the relayed UE and the UE-R may be realised using any communication technology, for example, WLAN, Wi-Fi, FlashLinQ, WiMAX, Bluetooth, BLE, ZigBee, etc. (irrespective of the communication technology used between the base station and the relaying user communication device).

In the above embodiments, a Layer 2 communication link is provided between the relayed user communication device and the ReNB. However, the term 'Layer 2 link' in this case refers to the communication link from the point of view of the relayed user communication device, which may not correspond to Layer 2 from the network point of view. It will be appreciated that the network side of the 'Layer 2 link' may be connected to a different layer than the UE side, since "normal" network Layer 2 may correspond the same layer or it may correspond to a different layer (such as a layer below Layer 2).

It will be appreciated that on top of the Layer 2 protocols, as shown in FIG. 12, the relayed UE may also implement an IP layer as well, which may be associated with an optional transport layer. The transport layer may comprise e.g. a TCP layer, an UDP layer, an SCTP layer, and/or the like.

It will be appreciated that the base station may comprise a Low Power Node (LPN), such as a home base station, a femto base station, and/or the like. It will also be appreciated that either one of (or both) the relaying and the relayed user communication devices may comprise a Low Power Node.

It will be appreciated that the UE-R and the ReNB may multiplex (e.g. using an appropriate multiplexing layer) multiple Layer 2 links they have with each other. In this case, the UE-R may multiplex multiple Layer 2 links (established for the same relayed UE or established for different relayed UEs) over a single IP connection with the ReNB.

In the above description, the relay-server module 45 of the UE-R 3R is described as initiating IP connection establishment. It will be appreciated, however, that the UE-R 3R may communicate the relayed UE's registration request (e.g. by forwarding the associated ProSe PDU) to the ReNB-server module 65 of the ReNB 5 and the ReNB 5 may initiate IP connection establishment based on that request (and/or carry out registration of the relayed UE 3). In this case, it will be appreciated that the messages transmitted in steps S119, S121, and S125 may also comprise appropriately formatted ProSe PDUs (i.e. the messages at steps S118, S122, and S124 may be relayed by the UE-R 3R).

In the above description of FIGS. 5, 6, and 7, the relayed user communication device, the UE-R, and the ReNB are described to include the relay-client module, the relay-server module, and the ReNB-server module, respectively, which are configured to manage the control plane aspects of the establishment of a layer 2 link between the relayed user communication device and the ReNB. However, it will be appreciated that such modules may have different names in different implementations. Further, the functionality of the "relay-server" module and/or the "relay-client" module are not limited to server and/or client functionality only but are intended to cover both functionalities, where appropriate. For example, it will be appreciated that the function of the "relay-server" module might be regarded as a client from the point of view of the ReNB-server module (and/or the relay-client module). The "relay-server" module might also be regarded as a relay (rather than a client and/or a server) since the relay-server module might be configured to simply relay messages between the relayed user communication device and the ReNB. For example, such a "relay-server" module may be dedicated to support a specific combination of communication endpoints (e.g. a specific ReNB and a specific relayed user communication device pair), in which case the functionality of the "relay-server" module may be limited to relaying functionality between the specific endpoints. It will also be appreciated that in this case the "relay-server" may not need to register the specific relayed user communication device and/or look up the APN corresponding to the specific ReNB that the dedicated "relay-server" module is configured to support.

In step S202 of FIG. 9, the relayed user communication device is described to communicate NAS signalling using its (ECM) connection with its serving MME. Thus, in FIG. 9, the relayed user communication device may request the MME to provide a service (e.g. a dedicated bearer) using NAS signalling. However, instead of using regular NAS signalling, it will also be appreciated that the relayed user communication device may be configured to exchange NAS signalling messages within user-plane PDUs, e.g. as described in steps S118 to S125 for RRC signalling messages.

It will be appreciated that the relay-client module, the relay-server module, and the ReNB-server module may use any suitable communication protocol, e.g. a protocol derived from the RRC protocol specified in 3GPP TS 23.331.

It will be appreciated that it is possible to use PDCP as well on top of a Layer 2 link established between the relayed user communication device and the ReNB. However, in this case the PDCP services may be limited to a subset of all PDCP functionalities.

In the above examples, the UE-R and the relayed UE are served by different core networks. However, it will also be appreciated that the serving core network for the UE-R may be the same as the relayed UE's core network.

In the above examples, the user communication devices perform an optional discovery procedure in order to establish a D2D connection with each other. It will be appreciated that the user communication devices may realise such a discovery procedure by communicating any suitable messages to each other, e.g. by communicating system information broadcast (SIB) messages, master information block (MIB) messages, information exchange messages, messages forming part of a request/reply-based mechanism, and/or the like.

In the above examples, two user communication devices were allowed to establish a direct D2D connection with each other. As those skilled in the art will appreciate, such connections may be established between three or more user communication devices, such that the users of the user communication devices may be connected together in a conference call setup. In this case, a D2D bearer may be provided between three or more user communication devices (e.g. all relayed user communication devices can connect to their respective ReNB via the same UE-R).

In the above description, a D2D bearer is being set up between the relaying user communication device and the relayed user communication device(s) for relaying group service data. It will be appreciated that such a 'D2D bearer' may comprise at least one of: a D2D radio bearer; a D2D EPS bearer; a D2D service bearer; and/or the like.

The above examples have been discussed with reference to UE-R technology. However, it will be appreciated that the examples are also applicable to other fields such as D2D (Device-to-Device), P2P (Peer-to-Peer), and/or P2M (Peer-to-Multipeer) technologies.

In the above description, the UE-R is described as a standalone entity. However, it will be appreciated that the UE-R functionality described above may be implemented using multiple entities. For example, the UE-R functionality (including an associated relay-server functionality) may be provided by a plurality of user communication devices connected in a hop-by-hop manner to a base station, using respective D2D/ProSe connections to provide each 'hop' between two neighbour user communication devices. It will also be appreciated that the UE-R may be provided in the form of an apparatus, e.g. as a user communication device connected to a wireless router, laptop computer, and/or the like.

In the above embodiments, the user equipment comprise mobile (cellular) communication devices. Other types of user devices such as, for example, mobile telephones, smartphones, personal digital assistants, laptop computers, web browsers, MTC (Machine Type Communication) devices, etc. could be used.

In the above description of FIGS. 8 and 9, specific signalling messages were given as examples (e.g. 'RRC Connection Request' messages, 'RRC Connection Setup' messages, etc.). However, it will be appreciated that different signalling messages may also be used, for example any suitable Access Stratum (AS) and/or Non-Access Stratum (NAS) messages and/or non-3GPP messages.

In particular, it will be appreciated that the following RRC messages (and associated procedures) may be supported for the relayed user communication device whilst it connects to the network via a UE-R:
 "RRC Connection Request" message;
 "RRC Connection Setup" message;
 "RRC Connection Setup Complete" message;
 "RRC Connection Reconfiguration" message;
 "RRC Connection Reconfiguration Complete" message;
 measurement commands (normally transmitted using RRC Connection Reconfiguration messages and/or the like);
 "Measurement Report" messages; and/or
 handover commands (normally transmitted using RRC Connection Reconfiguration messages).

It will also be appreciated that the following NAS procedures (and messages) may be supported for the relayed user communication device whilst it connects to the network via a UE-R:
 NAS attach/detach procedure (e.g. "NAS Attach Request" message; "NAS Attach Complete" message; "PDN Connectivity Request" message; "NAS Detach Request" message; "NAS Detach Accept" message);
 NAS information for Tracking Area Update procedure (e.g. "NAS TAU Request" message; "NAS TAU Accept" message);
 NAS information procedure (e.g. "NAS Identity Request" message; "NAS Identity Response" message);
 authentication procedure (e.g. "NAS Authentication Request" message; "NAS Authentication Response" message);
 access to a service (for example, internet connectivity);
 (default) bearer creation procedure (e.g. "Activate Default Bearer Context Request" message; "Activate Default EPS Bearer Context Accept" message); and/or
 security configuration procedure (such as security mode procedures e.g. "NAS Security Mode Command" message; "NAS Security Mode Complete" message).

In the above description of FIGS. 8 and 9, activation of the bearer is requested by the relayed UE. However, it will be appreciated that the bearer may be directly activated by (or requested by) the UE-R. Alternatively, the bearer may be activated by a different entity e.g. the base station, the ReNB or MME.

In the above examples, the relayed user communication device is described to provide an identifier to the UE-R in the form of a GUTI. However, it will be appreciated that instead of (or in addition to) a GUTI, any other suitable identifier may be provided. For example, the relayed user communication device may provide an IMSI (e.g. one or more fields of an IMSI) and/or the like. The identities may comprise e.g. a TMSI (used for GUTI), a PLMN ID (used for GUTI and IMSI), an MSIN (used for IMSI), and/or the like.

Moreover, it will also be appreciated that the relayed UE may use a public identity (e.g. a phone number or similar, composed from a PLMN ID, an MSIN, an IMSI=PLMN ID+MSIN, and/or an IP address). It will also be appreciated that the relayed UE may use a non-public identity, i.e. an identity used only by 3GPP entities and only within the particular network serving the relayed UE. Such non-public identity may comprise, for example, a GUTI/TMSI (for NAS signalling) and/or an MME UE S1AP ID (for AS signalling).

Further, it will be appreciated that when the UE-R determines that a user communication device is no longer connected (e.g. a relayed UE went out of coverage or performed a handover to another UE-Relay or a base station), the UE-R (using its relay-server) may update the ReNB associated with the user communication device that is no longer connected to the UE-R. In this case, the Layer 2 link for the no longer connected UE may be suspended and/or any traffic sent over that Layer 2 link may be rerouted to another Layer 2 link (if available) or buffered until the UE becomes connected again.

It will be appreciated that some messages may be sent from/to the network at the same time (e.g. combined) and/or messages may be sent at different times, and in a different order than they are presented above.

In the above description, the (relayed/relaying) user communication device and the remote base station are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above embodiments, a number of software modules were described. As those skilled in the art will appreciate, the software modules may be provided in compiled or un-compiled form and may be supplied to the (relayed/relaying) user communication device and/or the remote base station as a signal over a computer network, or on a recording medium. Further, the functionality performed by part or all of this software may be performed using one or more dedicated hardware circuits. However, the use of software modules is preferred as it facilitates the updating of the (relayed/relaying) user communication device and/or the remote base station in order to update their functionalities.

Various other modifications will be apparent to those skilled in the art and will not be described in further detail here.

Glossary of 3GPP Terms

D2D—Device to Device
eNB—Evolved NodeB, E-UTRAN base station

EPC—Evolved Packet Core
EPS—Evolved Packet System
E-UTRA—Evolved UMTS Terrestrial Radio Access
E-UTRAN—Evolved UMTS Terrestrial Radio Access Network
IP—Internet Protocol
LTE—Long Term Evolution (of UTRAN)
MAC—Media Access Control
MME—Mobility Management Entity
NAS—Non-Access-Stratum
PDCP—Packet Data Convergence Protocol
PDN—Packet Data Network
PDU—Packet Data Unit
P-GW—PDN Gateway
PHY—Physical Layer
ProSe—Proximity-based Services
(E-)RAB—(EPS-) Radio Access Bearer
RLC—Radio Link Control
RRC—Radio Resource Control
SCTP—Stream Control Transmission Protocol
SDP—Service Delivery Platform
S-GW—Serving Gateway
TFT—Traffic Flow Template
UDP—User Datagram Protocol
UE—User Equipment
UE-R—UE Relay
UMTS—Universal Mobile Telecommunications System Supplementary Notes The whole or part of the exemplary embodiment disclosed above can be described as, but not limited to, the following supplementary notes.

(Supplementary Note 1)

A relaying user communication device for facilitating the provision of a communication link for another user communication device, the relaying communication device comprising:
means for communicating with said other user communication device and with a first base station, wherein said communicating means is operable to:
  i) communicate with said other communication device over a first interface;
  ii) communicate with said first base station over a second interface;
  iii) communicate, via said first interface, a message for initiating provision of a communication link;
  iv) communicate with a core network, responsive to said message, to establish said communication link from said other user communication device, via said first interface and said second interface, to a second base station, the second base station being remote from said relaying user communication device; and
  v) relay data, for said other user communication device, via said first interface and said second interface, using said communication link when established.

(Supplementary Note 2)

The relaying user communication device according to note 1, wherein said message for initiating provision of a communication link comprises at least one of: a request for registering said other user communication device with said relaying user communication device; and a request for establishing a bearer for said other user communication device via said relaying user communication device.

(Supplementary Note 3)

The relaying user communication device according to note 1 or 2, wherein said message comprises a protocol data unit, PDU, specific to said first interface (e.g. a ProSe PDU).

(Supplementary Note 4)

The relaying user communication device according to any of notes 1 to 3, wherein said message includes at least one of: information identifying said relaying user communication device (e.g. a corresponding layer 2 identifier, L2-id); information identifying said other user communication device (e.g. a corresponding L2-id); and one or more parameter specific to said other user communication device (e.g. a globally unique temporary identity, GUTI).

(Supplementary Note 5)

The relaying user communication device according to any of notes 1 to 4, wherein said communicating means is operable to, in response to said message for initiating provision of a communication link, obtain information (e.g. an access point name, APN) identifying said second base station, and operable to establish a bearer for said other user communication device with a core network entity serving said relaying user communication device for communicating with said second base station.

(Supplementary Note 6)

The relaying user communication device according to any of notes 1 to 5, wherein said message for initiating provision of a communication link comprises at least one of: a request for establishing a dedicated bearer, for said other user communication device, via said relaying user communication device; and a request to reuse an existing bearer, for said other user communication device, via said relaying user communication device (Supplementary Note 7)

The relaying user communication device according to note 6, wherein said communicating means is operable to, in response to said request for establishing a dedicated bearer for said other user communication device, establish a dedicated bearer for said other user communication device with a core network entity (e.g. a packet data network, PDN, gateway) serving said relaying user communication device.

(Supplementary Note 8)

The relaying user communication device according to note 7, wherein said communicating means is operable to establish an internet protocol, IP, connection with said second base station over said dedicated bearer established with said core network entity.

(Supplementary Note 9)

The relaying user communication device according to any of notes 1 to 8, wherein said first interface comprises a device-to-device, D2D, bearer.

(Supplementary Note 10)

The relaying user communication device according to any of notes 1 to 9, wherein said second interface comprises an Evolved Packet System, EPS, bearer.

(Supplementary Note 11)

The relaying user communication device according to any of notes 1 to 10, wherein said communication link from said other user communication device to said second base station comprises a layer 2, L2, link.

(Supplementary Note 12)

The relaying user communication device according to any of notes 1 to 11, wherein said communication link from said other user communication device to said second base station comprises a packet data convergence protocol, PDCP, connection.

(Supplementary Note 13)

The relaying user communication device according to any of notes 1 to 12, wherein said relayed data comprises at least one of: radio resource control, RRC, signalling; non-access stratum, NAS, signalling; and internet protocol, IP, signalling.

(Supplementary Note 14)

The relaying user communication device according to any of notes 1 to 13, wherein said communicating means is operable to receive, via one of said first interface and said second interface, said data in at least one protocol data unit, PDU, and to relay said data by forwarding said PDU over the other one of said first interface and said second interface.

(Supplementary Note 15)

The relaying user communication device according to note 14, wherein said communicating means is operable to receive said at least one PDU via said first interface, and wherein said other user communication device is operable to initiate establishment of an RRC connection with said second base station by including, in said at least one PDU, an appropriately formatted signalling message (e.g. an RRC connection request message) for said second base station.

(Supplementary Note 16)

The relaying user communication device according to note 14 or 15, wherein said communicating means is operable to receive said at least one PDU via said first interface, and wherein said other user communication device is operable to initiate establishment of an NAS connection with a mobility management entity, MME, by including in said at least one PDU an appropriately formatted signalling message (e.g. a NAS signalling message) to said second base station.

(Supplementary Note 17)

The relaying user communication device according to any of notes 1 to 16, comprising user equipment in accordance with the long term evolution, LTE, set of standards.

(Supplementary Note 18)

A user communication device for communicating, over a relayed communication link in a communication network comprising a first base station and a second base station, the user communication device comprising:

means for communicating with a relaying user communication device connected to said first base station and, via said relaying user communication device, with said second base station wherein said second base station is remote from said relaying user communication device, wherein said communicating means is operable to:

i) communicate with said relaying user communication device over a first interface;

ii) send, via said first interface, to said relaying user communication device, a message for initiating provision of a communication link with the second base station;

iii) establish a communication link with said second base station, via said relaying user communication device; and iv) communicate data with said second base station over said communication link, via said relaying user communication device, when established.

(Supplementary Note 19)

The user communication device according to note 18, wherein said message for initiating provision of a communication link comprises at least one of: a request for registering said user communication device with said relaying user communication device; a request for establishing a dedicated bearer for said user communication device via said relaying user communication device; and a request to reuse an existing bearer, for said other user communication device, via said relaying user communication device.

(Supplementary Note 20)

The user communication device according to note 18 or 19, wherein said message comprises a protocol data unit, PDU, specific to said first interface (e.g. a ProSe PDU).

(Supplementary Note 21)

The user communication device according to any one of notes 18 to 20, wherein said message includes at least one of: information identifying said user communication device (e.g. a corresponding layer 2 identifier, L2-id); information identifying said relaying user communication device (e.g. a corresponding L2-id); and one or more parameter specific to said user communication device (e.g. a globally unique temporary identity, GUTI).

(Supplementary Note 22)

The user communication device according to any one of notes 18 to 21, wherein said message is configured to cause said relaying user communication device to establish a bearer for said user communication device with a core network entity serving said relaying user communication device for communicating with said second base station.

(Supplementary Note 23)

The user communication device according to any one of notes 18 to 22, wherein said message for initiating provision of a communication link comprises a request for establishing a dedicated bearer for said user communication device via said relaying user communication device.

(Supplementary Note 24)

The user communication device according to note 23, wherein said communicating means is operable to, in response to said request for establishing a dedicated bearer for said other user communication device, establish a dedicated bearer for with a core network entity (e.g. a packet data network, PDN, gateway) serving said relaying user communication device.

(Supplementary Note 25)

The user communication device according to note 24, wherein said communicating means is operable to establish an internet protocol, IP, connection with said second base station over said dedicated bearer established with said core network entity.

(Supplementary Note 26)

The user communication device according to any one of notes 23 to 25, wherein said dedicated bearer comprises an Evolved Packet System, EPS, bearer.

(Supplementary Note 27)

The user communication device according to any one of notes 18 to 26, wherein said first interface comprises a device-to-device, D2D, bearer.

(Supplementary Note 28)

The user communication device according to any one of notes 18 to 27, wherein said communication link comprises a layer 2, L2, link with said second base station.

(Supplementary Note 29)

The user communication device according to any one of notes 18 to 28, wherein said communication link comprises a packet data convergence protocol, PDCP, connection with said second base station.

(Supplementary Note 30)

The user communication device according to any one of notes 18 to 29, wherein said data communicated with said second base station comprises at least one of: radio resource control, RRC, signalling; non-access stratum, NAS, signalling; and internet protocol, IP, signalling.

(Supplementary Note 31)

The user communication device according to note 30, wherein said communicating means is operable to communicate, via said first interface, said data in at least one protocol data unit, PDU, wherein said at least one PDU is relayed by said relaying user communication device over a second interface via said first base station.

(Supplementary Note 32)

The user communication device according to note 31, wherein said communicating means is operable to initiate establishment of an RRC connection with said second base station by including in said at least one PDU an appropriately formatted signalling message (e.g. an RRC connection request message) to said second base station.

(Supplementary Note 33)

The user communication device according to note 31 or 32, wherein said communicating means is operable to initiate establishment of a NAS connection with a mobility management entity, MME, by including in said at least one PDU an appropriately formatted signalling message (e.g. a NAS signalling message) to said second base station.

(Supplementary Note 34)

The user communication device according to any one of notes 18 to 33, comprising user equipment in accordance with the long term evolution, LTE, set of standards.

(Supplementary Note 35)

A base station for communicating with a relayed user communication device, the base station comprising:
means for communicating with a relaying user communication device connected to a base station and, via said relaying user communication device, with said relayed user communication device, wherein said communicating means is operable to:
i) communicate with said relaying user communication device over a first interface;
ii) communicate, via said first interface, with said relaying user communication device, a message for initiating provision of a communication link for said relayed user communication device;
iii) establish a communication link with said relayed user communication device, via said relaying user communication device; and
iv) communicate data with said relayed user communication device over said communication link, via said relaying user communication device, when established.

(Supplementary Note 36)

The base station according to note 35, wherein said message for initiating provision of a communication link comprises at least one of: a request for establishing a bearer for said relayed user communication device via said relaying user communication device; and a request to reuse an existing bearer, for said other user communication device, via said relaying user communication device.

(Supplementary Note 37)

The base station according to note 35 or 36, wherein said communicating means is operable to establish an internet protocol, IP, connection with said relaying user communication device.

(Supplementary Note 38)

The base station according to any of notes 35 to 37, wherein said communication link comprises a layer 2, L2, link with said relayed user communication device.

(Supplementary Note 39)

The base station according to any of notes 35 to 38, wherein said communication link comprises a packet data convergence protocol, PDCP, connection with said relayed user communication device.

(Supplementary Note 40)

The base station according to any of notes 35 to 39, wherein said data communicated with said relayed user communication device comprises at least one of: radio resource control, RRC, signalling; non-access stratum, NAS, signalling; and internet protocol, IP, signalling.

(Supplementary Note 41)

The base station according to note 40, wherein said communicating means is operable to communicate, via said first interface, said data in at least one protocol data unit, PDU, wherein said at least one PDU is relayed by said relaying user communication device over a second interface (e.g. a device-to-device, D2D, interface) with said relayed user communication device.

(Supplementary Note 42)

The base station according to note 41, wherein said communicating means is operable to receive said at least one PDU from said relayed user communication device, and wherein said communicating means is operable to establish an RRC connection with said relayed user communication device, via said relaying user communication device, in accordance with an appropriately formatted signalling message (e.g. an RRC connection request message) included in said at least one PDU received from said relayed user communication device.

(Supplementary Note 43)

The base station according to note 41 or 42, wherein said communicating means is operable to receive said at least one PDU from said relayed user communication device, and wherein said communicating means is operable to initiate establishment of an NAS connection with a mobility management entity, MME, based on an appropriately formatted signalling message (e.g. a NAS signalling message) included in said at least one PDU received from said relayed user communication device.

(Supplementary Note 44)

The base station according to note 42 or 43, comprising means for detecting control-plane signalling (e.g. NAS signalling) in said at least one PDU received from said relayed user communication device; and wherein said communicating means is operable to forward said control-plane signalling to a core network entity (e.g. a mobility management entity, MME) upon said detecting means detecting said control-plane signalling in said at least one PDU.

(Supplementary Note 45)

The base station according to any of notes 35 to 44, wherein said base station is provided in a network associated with said relayed user communication device.

(Supplementary Note 46)

The base station according to note 45, wherein said base station is provided in a core network portion of said network associated with said relayed user communication device.

(Supplementary Note 47)

The base station according to any of notes 35 to 46, configured to implement a subset of the functionalities of said second base station.

(Supplementary Note 48)

The base station according to any of notes 35 to 47, comprising a network node (e.g. an eNB) in accordance with the long term evolution, LTE, set of standards.

(Supplementary Note 49)

A system comprising the relaying user communication device according to any of notes 1 to 17, the user communication device according to any of notes 18 to 34, and the base station according to any of notes 35 to 48.

(Supplementary Note 50)

A relaying user communication device for facilitating the provision of a communication link for another user communication device, the relaying communication device comprising:
transceiver circuitry for communicating with said other user communication device and with a first base station, wherein said transceiver circuitry is configured to:

i) communicate with said other communication device over a first interface;

ii) communicate with said first base station over a second interface;

iii) communicate, via said first interface, a message for initiating provision of a communication link;

iv) communicate with a core network, responsive to said message, to establish said communication link from said other user communication device, via said first interface and said second interface, to a second base station, the second base station being remote from said relaying user communication device; and v) relay data, for said other user communication device, via said first interface and said second interface, using said communication link when established.

(Supplementary Note 51)

A user communication device for communicating, over a relayed communication link in a communication network comprising a first base station and a second base station, the user communication device comprising:

transceiver circuitry for communicating with a relaying user communication device connected to said first base station and, via said relaying user communication device, with said second base station wherein said second base station is remote from said relaying user communication device, wherein said transceiver circuitry is configured to:

i) communicate with said relaying user communication device over a first interface;

ii) send, via said first interface, to said relaying user communication device, a message for initiating provision of a communication link with the second base station;

iii) establish a communication link with said second base station, via said relaying user communication device; and iv) communicate data with said second base station over said communication link, via said relaying user communication device, when established.

(Supplementary Note 52)

A base station for communicating with a relayed user communication device, the base station comprising:

transceiver circuitry for communicating with a relaying user communication device connected to a base station and, via said relaying user communication device, with said relayed user communication device, wherein said transceiver circuitry is configured to:

i) communicate with said relaying user communication device over a first interface;

ii) communicate, via said first interface, with said relaying user communication device, a message for initiating provision of a communication link for said relayed user communication device;

iii) establish a communication link with said relayed user communication device, via said relaying user communication device; and iv) communicate data with said relayed user communication device over said communication link, via said relaying user communication device, when established.

(Supplementary Note 53)

A method performed by a relaying user communication device for facilitating the provision of a communication link for another user communication device, wherein the relaying user communication device comprises means for communicating with said other user communication device over a first interface and with a first base station over a second interface, the method comprising:

communicating, via said first interface, a message for initiating provision of a communication link;

communicating with a core network, responsive to said message, to establish said communication link from said other user communication device, via said first interface and said second interface, to a second base station, wherein the second base station is remote from said relaying user communication device; and relaying data, for said other user communication device, via said first interface and said second interface, using said communication link when established.

(Supplementary Note 54)

A method performed by a user communication device for communicating, over a relayed communication link in a communication network comprising a first base station and a second base station, the user communication device comprising means for communicating, over a first interface, with a relaying user communication device connected to said first base station and, via said relaying user communication device, with said second base station wherein said second base station is remote from said relaying user communication device, the method comprising:

sending, via said first interface, to said relaying user communication device, a message for initiating provision of a communication link with the second base station;

establishing a communication link with said second base station, via said relaying user communication device; and communicating data with said second base station over said communication link, via said relaying user communication device, when established.

(Supplementary Note 55)

A method performed by a base station for communicating with a relayed user communication device, the base station comprising means for communicating, over a first interface, with a relaying user communication device connected to a base station and, via said relaying user communication device, with said relayed user communication device, the method comprising:

communicating, via said first interface, with said relaying user communication device, a message for initiating provision of a communication link for said relayed user communication device;

establishing a communication link with said relayed user communication device, via said relaying user communication device; and communicating data with said relayed user communication device over said communication link, via said relaying user communication device, when established.

(Supplementary Note 56)

A non-transitory computer readable medium storing a program. A computer implementable instructions product comprising computer implementable instructions for causing a programmable communications device to perform the method of notes 53 to 55.

INCORPORATION BY REFERENCE

This application is based upon and claims the benefit of priority from United Kingdom Patent Application No. 1402954.0 filed on Feb. 19, 2014, the disclosure of which is incorporated herein in its entirety by reference.

REFERENCE SIGNS LIST

3,3R USER COMMUNICATION DEVICE
5,5R BASE STATION
9,9R CORE NETWORK
10, 10R NETWORK
11 MME

13 S-GW
14 P-GW
15 IP PDN
31 TRANSCEIVER CIRCUIT
33 ANTENNA
35 USER INTERFACE
37 CONTROLLER
39 MEMORY
41,61 OPERATING SYSTEM
42,63 COMMUNICATION CONTROL MODULE
43 DEVICE-TO-DEVICE (D2D) MODULE
44 RELAY-CLIENT
45 RELAY-SERVER MODULE
46 NAS MODULE
47,67 RRC MODULE
48,68 IP MODULE
49,69 PDCP MODULE
65 ReNB-SERVER MODULE

The invention claimed is:

1. A relaying user communication device for facilitating the provision of a communication link for another user communication device, the relaying communication device comprising:
a transceiver configured to communicate with said another user communication device and a first base station, wherein the transceiver is configured to:
communicate with said another communication device over a first interface;
communicate with said first base station over a second interface;
communicate, via said first interface, a message for initiating provision of a communication link;
communicate with a core network, responsive to said message, to establish said communication link from said another user communication device to a second base station, the second base station being remote from said relaying user communication device, wherein said communication link is provided via both (1) said first interface between said another communication device and said relaying user communication device and (2) said second interface between said relaying user communication device and said first base station; and
relay data, for said another user communication device, via said first interface and said second interface, using said communication link,
wherein said message includes at least one of:
a first layer 2 identifier (L2-ID) identifying said relaying user communication device; and
a second L2-ID identifying said another user communication device.

2. The relaying user communication device according to claim 1, wherein said message for initiating provision of a communication link comprises at least one of:
a request for registering said another user communication device with said relaying user communication device; and
a request for establishing a bearer for said another user communication device via said relaying user communication device.

3. The relaying user communication device according to claim 1, wherein said message comprises a protocol data unit (PDU) specific to said first interface.

4. The relaying user communication device according to claim 1, wherein, in response to said message for initiating provision of a communication link, the transceiver is further configured to:
obtain information identifying said second base station, and
establish a bearer for said another user communication device with a core network entity serving said relaying user communication device for communicating with said second base station.

5. The relaying user communication device according to claim 1, wherein said message for initiating provision of a communication link comprises at least one of:
a request for establishing a dedicated bearer, for said another user communication device, via said relaying user communication device; and
a request to reuse an existing bearer, for said another user communication device, via said relaying user communication device.

6. The relaying user communication device according to claim 5, wherein, in response to said request for establishing a dedicated bearer for said another user communication device, the transceiver is further configured to:
establish a dedicated bearer for said another user communication device with a core network entity serving said relaying user communication device.

7. A user communication device for communications over a relayed communication link in a communication network comprising a first base station and a second base station, the user communication device comprising:
a transceiver configured to communicate with a relaying user communication device connected to said first base station, and with said second base station via said relaying user communication device, said second base station being remote from said relaying user communication device, wherein the transceiver is configured to:
communicate with said relaying user communication device over a first interface;
send, via said first interface, to said relaying user communication device, a message for initiating provision of a communication link with the second base station;
establish a communication link with said second base station, via said relaying user communication device, wherein said communication link is provided via both (1) said first interface between said user communication device and said relaying user communication device and (2) a second interface between said relaying user communication device and said first base station; and
communicate data with said second base station over said communication link, via said relaying user communication device.

8. The user communication device according to claim 7, wherein said message for initiating provision of a communication link comprises at least one of:
a request for registering said user communication device with said relaying user communication device;
a request for establishing a dedicated bearer for said user communication device via said relaying user communication device; and
a request to reuse an existing bearer, for said user communication device, via said relaying user communication device,
wherein said message includes at least one of:
a first layer 2 identifier (L2-ID) identifying said user communication device; and
a second L2-ID identifying said relaying user communication device.

9. The user communication device according to claim 7, wherein said message comprises a protocol data unit (PDU) specific to said first interface.

10. The user communication device according to claim 7, wherein said message is configured to cause said relaying user communication device to establish a bearer for said user communication device with a core network entity serving said relaying user communication device for communicating with said second base station.

11. The user communication device according to claim 7, wherein said message for initiating provision of a communication link comprises a request for establishing a dedicated bearer for said user communication device via said relaying user communication device.

12. The user communication device according to claim 11, wherein, in response to said request for establishing a dedicated bearer for said other user communication device, the transceiver is further configured to:
establish a dedicated bearer with a core network entity serving said relaying user communication device.

13. A method performed by a relaying user communication device for facilitating the provision of a communication link for another user communication device, the relaying user communication device comprising a transceiver communicating with said another user communication device over a first interface and with a first base station over a second interface, the method comprising:
communicating, via said first interface, a message for initiating provision of a communication link;
communicating with a core network, responsive to said message, to establish said communication link from said another user communication device to a second base station, wherein the second base station is remote from said relaying user communication device, wherein said communication link is provided via both (1) said first interface between said another communication device and said relaying user communication device and (2) said second interface between said relaying user communication device and said first base station; and
relaying data, for said another user communication device, via said first interface and said second interface, using said communication link,
wherein said message includes at least one of:
a first layer 2 identifier (L2-ID) identifying said another user communication device; and
a second L2-ID identifying said relaying user communication device.

14. A method performed by a user communication device for communications over a relayed communication link in a communication network comprising a first base station and a second base station, said user communication device comprising a transceiver communicating, over a first interface, with a relaying user communication device connected to said first base station, and, via said relaying user communication device, with said second base station, said second base station being remote from said relaying user communication device, the method comprising:
sending, via said first interface, to said relaying user communication device, a message for initiating provision of a communication link with the second base station;
establishing a communication link with said second base station via said relaying user communication device, wherein said communication link is provided via both (1) said first interface between said user communication device and said relaying user communication device and (2) a second interface between said relaying user communication device and said first base station; and
communicating data with said second base station over said communication link via said relaying user communication device,
wherein said message includes at least one of:
a first layer 2 identifier (L2-ID) identifying said user communication device; and
a second L2-ID identifying said relaying user communication device.

15. A non-transitory computer-readable medium storing instructions which, when executed, cause a programmable communication device to perform a method for communications over a relayed communication link in a communication network comprising a first base station and a second base station, said user communication device comprising a transceiver communicating, over a first interface, with a relaying user communication device connected to said first base station, and, via said relaying user communication device, with said second base station, said second base station being remote from said relaying user communication device, the method comprising:
sending, via said first interface, to said relaying user communication device, a message for initiating provision of a communication link with the second base station;
establishing a communication link with said second base station via said relaying user communication device, wherein said communication link is provided via both (1) said first interface between said user communication device and said relaying user communication device and (2) a second interface between said relaying user communication device and said first base station; and
communicating data with said second base station over said communication link via said relaying user communication device,
wherein said message includes at least one of:
a first layer 2 identifier (L2-ID) identifying said user communication device; and
a second L2-ID identifying said relaying user communication device.

* * * * *